US009738837B2

(12) United States Patent
Bell et al.

(10) Patent No.: US 9,738,837 B2
(45) Date of Patent: Aug. 22, 2017

(54) PROCESS AND SYSTEM FOR TREATING OIL SANDS PRODUCED GASES AND LIQUIDS

(71) Applicant: Cenovus Energy Inc., Calgary (CA)

(72) Inventors: Kelly M. Bell, Calgary (CA); Russell H. Wickes, Calgary (CA)

(73) Assignee: Cenovus Energy, Inc., Calgary (CA)

( * ) Notice: Subject to any disclaimer, the term of this patent is extended or adjusted under 35 U.S.C. 154(b) by 573 days.

(21) Appl. No.: 14/276,722

(22) Filed: May 13, 2014

(65) Prior Publication Data

US 2014/0332447 A1    Nov. 13, 2014

Related U.S. Application Data

(60) Provisional application No. 61/822,498, filed on May 13, 2013.

(51) Int. Cl.
*C10G 1/00* (2006.01)
*C10G 33/04* (2006.01)
(Continued)

(52) U.S. Cl.
CPC .............. *C10G 33/04* (2013.01); *B01D 53/14* (2013.01); *B01D 53/1468* (2013.01);
(Continued)

(58) Field of Classification Search
CPC ........ C10G 1/002; C10G 33/04; B01D 53/14; B01D 53/1468; B01D 53/1493
See application file for complete search history.

(56) References Cited

U.S. PATENT DOCUMENTS 2,994,589 A    8/1961    Stolfa et al.
3,716,620 A    2/1973    Deschamps et al.
(Continued)

FOREIGN PATENT DOCUMENTS

CA    1304287    6/1992
CA    2096034    11/1994
(Continued)

OTHER PUBLICATIONS

Esteban, Alejandro, et al. (2000) Exploit the Benefits of Methanol, Proceedings of 79th GPA Annual Convention, Atlanta, GA.
(Continued)

*Primary Examiner* — Renee Robinson
(74) *Attorney, Agent, or Firm* — Knobbe Martens Olson & Bear LLP

(57) ABSTRACT

The present disclosure provides a process and system for removing at least a portion of organosulfur compounds from an oil sands produced gas and transferring the organosulfur compounds to a bitumen-based liquid. One example of the system includes an absorber to contact the gas with an amount of liquid hydrocarbon sufficient to absorb some of the organosulfur compounds, producing an organosulfur enriched liquid hydrocarbon. The system includes a separator that accepts the organosulfur enriched liquid hydrocarbon and an emulsion that includes water and the bitumen-based liquid. The separator separates produced water from a bitumen-based mixture of organosulfur enriched liquid hydrocarbon and bitumen-based liquid. The system adds an amount of additional liquid hydrocarbon to separate the produced water from the bitumen-based mixture when the amount of liquid hydrocarbon added is less than the amount of liquid hydrocarbon needed to separate the produced water from the bitumen-based mixture.

10 Claims, 7 Drawing Sheets

(51) Int. Cl.
  *B01D 53/14*   (2006.01)
  *C10G 31/08*   (2006.01)
(52) U.S. Cl.
  CPC ......... *B01D 53/1493* (2013.01); *C10G 1/002* (2013.01); *C10G 31/08* (2013.01); *C10G 2300/308* (2013.01)

(56) References Cited

U.S. PATENT DOCUMENTS

| | | | |
|---|---|---|---|
| 3,760,564 | A | 9/1973 | Alders et al. |
| 4,020,144 | A | 4/1977 | Bosniack |
| 4,116,275 | A | 9/1978 | Butler |
| 4,344,485 | A | 8/1982 | Butler |
| 4,465,587 | A | 8/1984 | Garg et al. |
| 4,775,395 | A | 10/1988 | Rojey et al. |
| 4,853,012 | A | 8/1989 | Batteux et al. |
| 4,957,715 | A | 9/1990 | Grover et al. |
| 4,979,966 | A | 12/1990 | Rojey et al. |
| 5,211,230 | A | 5/1993 | Ostapovich |
| 5,948,242 | A * | 9/1999 | Ohsol ................. C10G 21/003 208/179 |
| 7,192,565 | B2 | 3/2007 | Briot et al. |
| 7,635,424 | B2 | 12/2009 | Briot et al. |
| 7,674,444 | B2 | 3/2010 | Mak |
| 7,717,171 | B2 | 5/2010 | Stegemeier et al. |
| 7,749,378 | B2 | 7/2010 | Iqbal et al. |
| 7,771,685 | B2 | 8/2010 | Gal |
| 7,862,708 | B2 | 1/2011 | Siskin et al. |
| 2007/0111903 | A1* | 5/2007 | Engel ................. B01D 17/047 507/261 |
| 2010/0115993 | A1 | 5/2010 | Demmers et al. |
| 2010/0202935 | A1 | 8/2010 | Gal |
| 2012/0205096 | A1 | 8/2012 | Chhina et al. |
| 2012/0205127 | A1 | 8/2012 | Gittins et al. |
| 2014/0144811 | A1* | 5/2014 | Watson ............. B01D 53/1468 208/390 |

FOREIGN PATENT DOCUMENTS

| | | |
|---|---|---|
| CA | 2594413 | 7/2006 |
| CA | 2594414 | 7/2006 |
| CA | 2678347 | 2/2010 |
| CA | 2692204 | 8/2010 |
| FR | 1459057 | 9/1965 |
| GB | 1121529 | 7/1968 |
| RU | 2185870 C1 | 7/2002 |
| WO | WO 87/07904 | 12/1987 |
| WO | WO 02/102933 | 12/2002 |
| WO | WO 02/102934 | 12/2002 |
| WO | WO 02/102935 | 12/2002 |
| WO | WO 02/102936 | 12/2002 |
| WO | WO 02/102940 | 12/2002 |
| WO | WO 2011/066523 | 6/2011 |
| WO | WO 2012/106290 | 8/2012 |
| WO | WO 2014/085559 A1 | 6/2014 |

OTHER PUBLICATIONS

U.S. Appl. No. 14/283,882, filed May 21, 2014, Canas et al.
U.S. Appl. No. 14/327,446, filed Jul. 9, 2014, Gittins et al.

* cited by examiner

PROCESS AND SYSTEM FOR TREATING OIL SANDS PRODUCED GASES AND LIQUIDS

CROSS REFERENCE TO RELATED APPLICATIONS

This application claims the benefit of priority of U.S. Provisional Patent Application No. 61/822,498 filed May 13, 2013, the disclosure of which is hereby incorporated herein by reference in its entirety.

FIELD

The present disclosure relates generally to processes and systems for treating oil sands produced gases and liquids. More particularly, the present disclosure relates to processes and systems for removing organosulfur compounds from an oil sands produced gas.

BACKGROUND

Heavy oil from oil sands may be recovered using a thermal in-situ recovery process, such as: steam-assisted gravity drainage (SAGD), expanding solvent steam-assisted gravity drainage (ES-SAGD), cyclic steam stimulation (CSS), steamflooding, solvent-assisted cyclic steam stimulation, toe-to-heel air injection (THAI), or a solvent aided process (SAP).

Gas produced from oil sands recovery processes often contains sulfur in the form of $H_2S$ and organosulfur compounds, as well as $CO_2$, naphthenes, and aromatics. It is desirable to remove at least a portion of the sulfur, for example, in order to meet regulatory requirements for reducing emissions.

The selection of suitable sulfur removal processes for gases produced during oil sands production of heavy oil is challenging due to the complex nature of the organosulfur species present in the heavy oil. Organosulfur compounds are compounds that include a thiol (—SH) chemical functionality. These compounds are also known as mercaptans. Examples of organosulfur compounds that are found in gases produced during oil sands production of heavy oil include: methylmercaptan, ethylmercaptan, and propylmercaptan.

Specific process conditions may reduce the effectiveness of a sulfur removal process. Amine/Claus technology is the conventional technology selection for sulfur inlet gas rates above 10 to 20 tonnes/day. Claus Plant performance requires a minimum $H_2S$ concentration to sustain combustion in the reaction furnace. Oil sands produced gas often has high ratios of $CO_2$:$H_2S$ which may preclude the use of this technology.

Non-regenerable scavengers of $H_2S$ have been used with mixed success. However, the operating costs are prohibitive and significant solid or liquid waste is generated. These processes are typically not attractive at sulfur removal rates above 100-200 kg/day for typical plant sizes.

A liquid reduction-oxidation (redox) process is typically used for sulfur removal in the range of 100 kg/day to 10 tonne/day; however, the contaminants in oil sands produced gases pose some challenges for liquid redox processes. Organosulfur compounds absorbed from the gas by a lean liquid redox solution may exit the system in the oxidizer vent, creating unwanted emissions, or be converted into disulfides (RS-SR compounds) that exit the system with the sulfur product. The formation of disulfides has the potential to impact liquid redox solution performance and pose undesirable odor and exposure issues when the sulfur product is handled.

U.S. Pat. No. 7,674,444 to Mak discloses a process in which $H_2S$ and other sulfur species are absorbed in a lean hydrocarbon liquid. The sulfur species are subjected to catalytic conversion into disulfides, which are removed from the hydrocarbon liquid. The sulfur free hydrocarbon liquid is regenerated in a distillation column and/or refinery unit, and light components are recycled to the absorber. Selective separation of $H_2S$ and mercaptan components via distillation can be difficult, distillation columns can be expensive to build, and/or distillation columns can require large amounts of energy to operate.

SUMMARY

In a first aspect, the present disclosure provides a process for removing at least a portion of organosulfur compounds from an oil sands produced gas and transferring the organosulfur compounds to a bitumen-based liquid. The process includes: contacting the oil sands produced gas with an amount of liquid hydrocarbon sufficient to absorb at least a portion of the organosulfur compounds, thereby generating an organosulfur depleted gas and an organosulfur enriched liquid hydrocarbon; adding the organosulfur enriched liquid hydrocarbon to an emulsion comprising water and the bitumen-based liquid to separately generate produced water and a bitumen-based mixture of organosulfur enriched liquid hydrocarbon and bitumen-based liquid; and when the amount of liquid hydrocarbon used to absorb the organosulfur compounds from the oil sands produced gas is less than the amount of liquid hydrocarbon needed to separate the produced water from the bitumen-based mixture, adding a sufficient amount of additional liquid hydrocarbon to separate the produced water from the bitumen-based mixture.

The additional liquid hydrocarbon may be added to: the emulsion comprising water and bitumen-based liquid; the organosulfur enriched liquid hydrocarbon; the organosulfur enriched liquid hydrocarbon and bitumen-based liquid mixture; or any combination thereof.

The organosulfur enriched liquid hydrocarbon and additional liquid hydrocarbon may be added in amounts sufficient to result in the density of the bitumen-based mixture being from about 920 to about 990 $kg/m^3$. In some embodiments the bitumen-based mixture has a density from about 940 to about 960 $kg/m^3$.

The liquid hydrocarbon, additional liquid hydrocarbon, or both may have a density in the range of about 690 to about 720 $kg/m^3$.

The liquid hydrocarbon, the additional liquid hydrocarbon, or both may be a mixture of hydrocarbons, for example a $C_3$-$C_{30}$ hydrocarbon or a $C_4$-$C_{20}$ hydrocarbon.

The liquid hydrocarbon, the additional liquid hydrocarbon, or both may be an oil sands condensate, a synthetic hydrocarbon blend, naphtha, butane, or any combination thereof.

The liquid hydrocarbon may be the same as the additional liquid hydrocarbon.

Separately generating produced water and the bitumen-based mixture may include separating at least a portion of the water in the emulsion from the bitumen-based mixture. Separating at least a portion of the water in the emulsion from the bitumen-based mixture may include using: heat, gravity segregation, electric current, a chemical additive, or any combination thereof, to break or reduce the emulsion.

Separately generating produced water and the bitumen-based mixture may also include degassing the bitumen-based mixture to produce separated gas.

The temperature of the oil sands produced gas provided to the absorber may be in the range of about 5 to about 60° C. In particular examples, the oil sands produced gas temperature is about 40° C. To prevent condensation of a compound that may contribute to foaming, for example organosulfur compounds, the temperature of the liquid hydrocarbon provided to the absorber may be at least 5° C. higher than the temperature of the oil sands produced gas provided to the absorber.

The oil sands produced gas may be contacted with the liquid hydrocarbon at a pressure between about 200 and about 2,500 kPag, for example at a pressure between about 500 and about 700 kPag.

The oil sands produced gas provided to the absorber, along with any separated gas recycled to the absorber, may be contacted with the liquid hydrocarbon in a liquid/gas ratio of about 0.0001 to about 0.015 actual $m^3$ liquid hydrocarbon/standard $m^3$ gas.

In particular examples, the absorber may be operated at about 0.0004 to about 0.007 actual $m^3$ liquid hydrocarbon/standard $m^3$ gas.

The process may exclude distillation of the organosulfur enriched liquid hydrocarbon.

According to another aspect of the present disclosure, there is provided a system for removing at least a portion of organosulfur compounds from an oil sands produced gas and transferring the organosulfur compounds to a bitumen-based liquid.

The system includes: an absorber that contacts the oil sands produced gas with an amount of liquid hydrocarbon sufficient to absorb at least a portion of the organosulfur compounds, producing an organosulfur depleted gas and an organosulfur enriched liquid hydrocarbon; a separator that accepts the organosulfur enriched liquid hydrocarbon and an emulsion comprising water and the bitumen-based liquid and separates produced water from a bitumen-based mixture of organosulfur enriched liquid hydrocarbon and bitumen-based liquid; and a controller that adds a sufficient amount of additional liquid hydrocarbon to separate the produced water from the bitumen-based mixture when the amount of liquid hydrocarbon used to absorb the organosulfur compounds from the oil sands produced gas is less than the amount of liquid hydrocarbon needed to separate the produced water from the bitumen-based mixture.

The controller may add the additional liquid hydrocarbon to: the emulsion, the organosulfur enriched liquid hydrocarbon, the organosulfur enriched liquid hydrocarbon and bitumen-based liquid mixture, a product stream from a component of the separator, or any combination thereof.

The controller may add additional liquid hydrocarbon in an amount sufficient to result in the density of the bitumen-based mixture being from about 920 to about 990 kg/$m^3$. In some embodiments the controller may add additional liquid hydrocarbon in an amount sufficient to result in the density of the bitumen-based mixture being from about 940 to about 960 kg/$m^3$.

The controller may be in communication with a sensor or detector that signals to the controller to add additional liquid hydrocarbon when the density of the bitumen-based mixture is outside a desired density range.

The liquid hydrocarbon, additional liquid hydrocarbon, or both, may have a density in the range of about 690 to about 720 kg/$m^3$.

The liquid hydrocarbon, the additional liquid hydrocarbon, or both may be a mixture of hydrocarbons, for example a $C_3$-$C_{30}$ hydrocarbon or a liquid $C_4$-$C_{20}$ hydrocarbon.

The liquid hydrocarbon, the additional liquid hydrocarbon, or both may be an oil sands condensate, a synthetic hydrocarbon blend, naphtha, butane or any combination thereof.

The liquid hydrocarbon may be the same as the additional liquid hydrocarbon.

The separator may include: an inlet degasser that degasses the emulsion to produce a separated gas; an outlet degasser that degasses the bitumen-based liquid to produce a separated gas; or both.

At least a portion of the separated gas produced from the separator may be directed back to the absorber.

The separator may include a liquid/liquid separator that includes: a free water knock out, a treater, any other separator which may be used to break or reduce the emulsion, a plurality of any of the above, or any combination thereof.

The liquid/liquid separator may include a free water knock out and a treater.

The temperature of the oil sands produced gas provided to the absorber may be in the range of about 5 to about 60° C. In particular examples, the oil sands produced gas temperature is about 40° C. To prevent condensation of a compound that may contribute to foaming, for example organosulfur compounds, the temperature of the liquid hydrocarbon provided to the absorber may be at least 5° C. higher than the temperature of the oil sands produced gas provided to the absorber.

The absorber may be operated at a pressure between about 200 and about 2,500 kPag, for example at a pressure between about 500 and about 700 kPag.

The absorber may contact the oil sands produced gas, along with any separated gas returned to the absorber, with the liquid hydrocarbon in a liquid/gas ratio of about 0.0001 to about 0.015 actual $m^3$ liquid hydrocarbon/standard $m^3$ gas.

In particular examples, the absorber may be operated at about 0.0004 to about 0.007 actual $m^3$ liquid hydrocarbon/standard $m^3$ gas.

The system may exclude a distillation apparatus that purifies liquid hydrocarbon from the organosulfur enriched liquid hydrocarbon.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a system and process for removing at least a portion of organosulfur compounds from an oil sands produced gas and transferring the organosulfur compounds to a bitumen-based liquid.

The oil sands produced gas may be a gas produced via steam-assisted gravity drainage (SAGD), expanding solvent steam-assisted gravity drainage (ES-SAGD), cyclic steam stimulation (CSS), steamflooding, solvent-assisted cyclic steam stimulation, toe-to-heel air injection (THAI), a solvent aided process (SAP), or any combination thereof. The oil sands produced gas used in the process or system according to the present disclosure does not need to be received directly from the production well. The oil sands produced gas may be processed before being used according to the present disclosure. For example, the oil sands produced gas may be treated to remove one or more sulfur compounds, such as by an amine treatment.

The process may use infrastructure already being used to treat liquids and/or gases produced during oil sands recovery processes. Similarly, the system may incorporate infrastructure already being used to treat liquids and/or gases produced during oil sands recovery processes.

Figure 1:
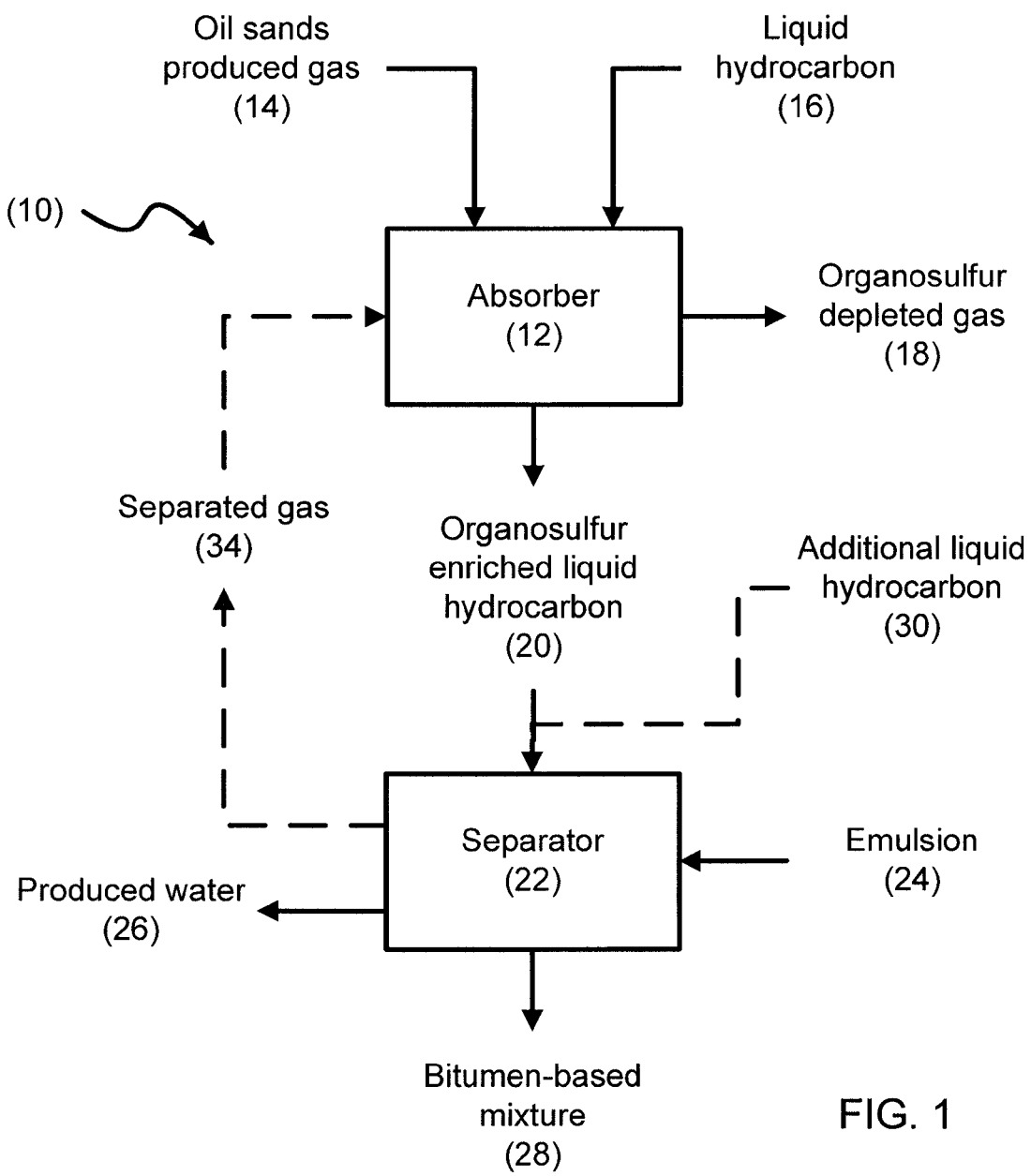
FIG. 1 is an illustration of a system according to the present disclosure.

One example of a system according to the present disclosure is illustrated in FIG. 1. The system (10) includes an absorber (12) that contacts the oil sands produced gas (14) with an amount of liquid hydrocarbon (16) sufficient to absorb at least a portion of the organosulfur compounds, producing an organosulfur depleted gas (18) and an organosulfur enriched liquid hydrocarbon (20). The amount of liquid hydrocarbon (16) sufficient to absorb at least a portion of the organosulfur compounds may be a function of the pressure in the absorber (12), the type of organosulfur compounds to be absorbed from the oil sands produced gas (14), the quantity of organosulfur compounds to be absorbed from the oil sands produced gas (14), or any combination thereof.

The system (10) also includes a separator (22) that accepts the organosulfur enriched liquid hydrocarbon (20) and an emulsion (24) comprising water and the bitumen-based liquid and separates produced water (26) from a mixture of organosulfur enriched liquid hydrocarbon and bitumen-based liquid. In some example processes, the bitumen-based mixture (28) is unsaturated in organosulfur compounds.

The system (10) includes a controller that adds a sufficient amount of additional liquid hydrocarbon (30) to separate the produced water (26) from the bitumen-based mixture (28) when the amount of liquid hydrocarbon (16) used to absorb the organosulfur compounds from the oil sands produced gas (14) is less than the amount of liquid hydrocarbon needed to separate the produced water (26) from the bitumen-based mixture (28). The amount of additional liquid hydrocarbon (30) that is added may be a function of: the desired density of the bitumen-based mixture (28), the density of the emulsion (24) comprising water and the bitumen-based liquid, the density of the liquid hydrocarbon (16), the density of the additional liquid hydrocarbon, or any combination thereof. The amount of additional liquid hydrocarbon (30) that is added may be controlled, for example, by manually opening and closing a valve, or by automatically adjusting the amount based on detected system conditions.

The bitumen-based liquid and the water in the emulsion often have similar densities (around 1,000 kg/m$^3$), making them difficult to separate. Adding organosulfur enriched liquid hydrocarbon and additional liquid hydrocarbon to the emulsion reduces the density of the bitumen-based mixture. The reduced density of the bitumen-based mixture makes it easier to separate the bitumen-based mixture from the water. The organosulfur enriched liquid hydrocarbon and additional liquid hydrocarbon are added in sufficient quantities to achieve a desired density of the bitumen-based mixture. The organosulfur enriched liquid hydrocarbon and additional liquid hydrocarbon may be added in amounts sufficient to result in the density of the bitumen-based mixture being from about 920 to about 990 kg/m$^3$. In some embodiments the bitumen-based mixture has a density from about 940 to about 960 kg/m$^3$.

The controller may be manual or automatic, and could include, for example: a valve, a pump, a dispenser, or any combination thereof. The controller could be actuated to add or stop adding the additional liquid hydrocarbon, so that the sufficient amount of additional liquid hydrocarbon is added. For example, the controller may be in communication with a sensor or detector that signals to the controller to add or stop adding the additional liquid hydrocarbon. The sensor or detector may, for example: measure the density of the bitumen-based mixture and add additional liquid hydrocarbon until the bitumen-based mixture has a density from about 940 to about 960 kg/m$^3$, or measure the density of the emulsion and organosulfur enriched liquid hydrocarbon and add additional liquid hydrocarbon until the bitumen-based mixture has a density from about 940 to about 960 kg/m$^3$.

The liquid hydrocarbon may be a mixture of different hydrocarbons. The liquid hydrocarbon may be a $C_3$-$C_{30}$ hydrocarbon mixture. In particular examples, the liquid hydrocarbon is a $C_4$ hydrocarbon. In other examples, the liquid hydrocarbon is a $C_4$-$C_{20}$ hydrocarbon mixture. The liquid hydrocarbon may be an oil sands condensate, a synthetic hydrocarbon blend, naphtha (e.g., a $C_5$-$C_{12}$ hydrocarbon mixture), or butane. The liquid hydrocarbon may have a density in the range of about 690 to about 720 kg/m$^3$.

The liquid hydrocarbon used to absorb the organosulfur compounds may be the same as, or different from, the additional liquid hydrocarbon added to separate the produced water from the bitumen-based mixture.

The separator separates produced water from the bitumen-based mixture. The separator may also separate: gasses from the liquids, solids from the liquids, or both. Separation of gasses from liquids, or solids from liquids, may be achieved using the same liquid/liquid separating unit that separates produced water from the bitumen-based mixture. In some systems according to the present description, the separator may include one or more liquid/liquid separators.

Figure 2:
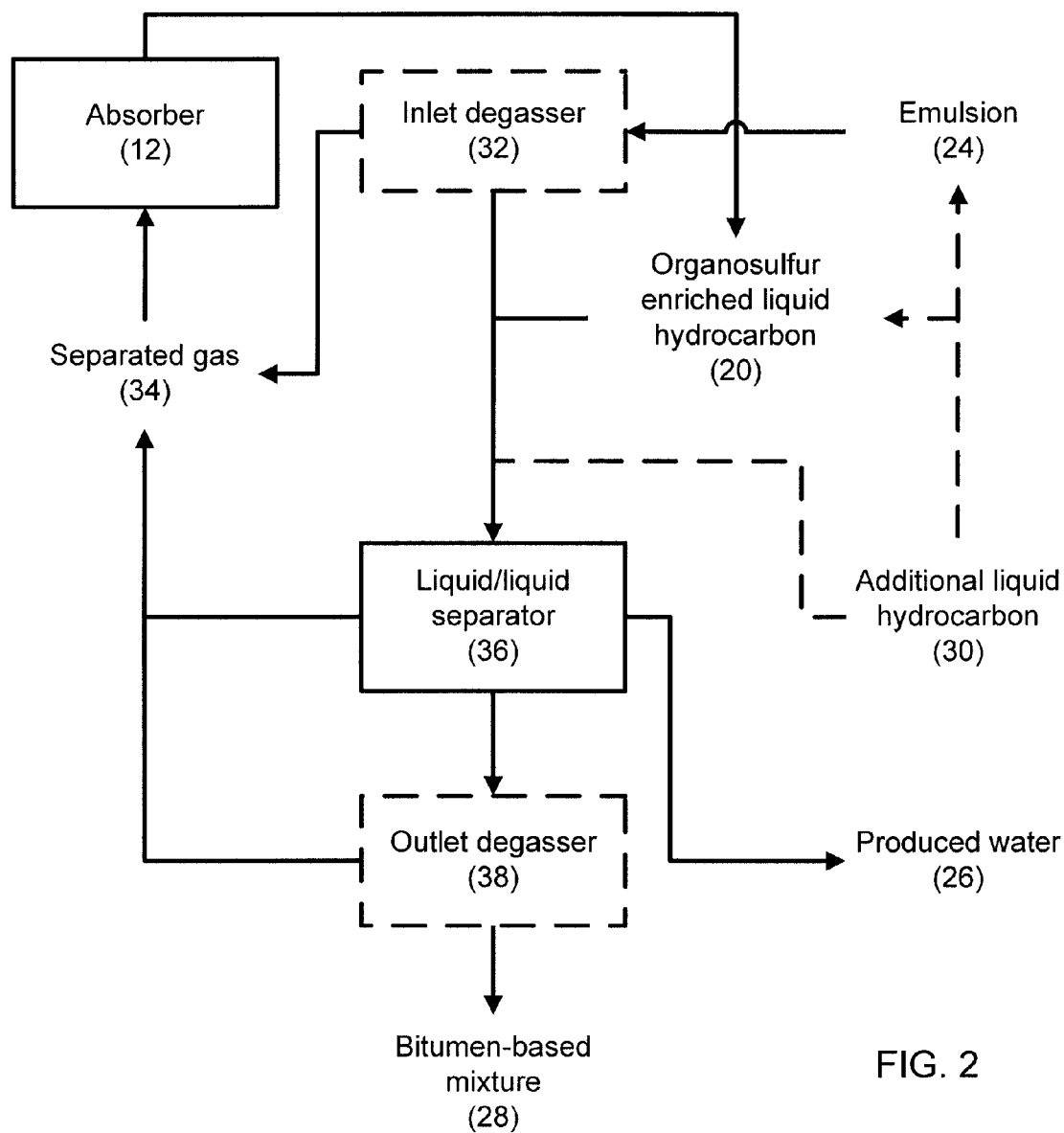
FIG. 2 is an illustration of an example separator which may be used in a system according to the present disclosure.

One example of a separator (22) which may be used in a system according to the present disclosure is illustrated in FIG. 2. The separator may include an inlet degasser (32) that degasses the emulsion (24) and produces a separated gas (34). The separated gas (34) may be treated with liquid hydrocarbon, for example by being directed to the absorber (12).

The separator accepts the emulsion (24) and the organosulfur enriched liquid hydrocarbon (20) and includes a liquid/liquid separator (36) to separate the produced water (26) from the bitumen-based mixture (28). The liquid/liquid separator (36) may include: a free water knock out, a treater, any other separator which may be used to break or reduce the emulsion, a plurality of any of the above, or any combination thereof.

A "free water knock out" would be understood to refer to a separator which may be used to separate hydrocarbon-based liquids, and any free water and hydrophilic compounds. After separation, the liquids may be then passed into a separate vessel, such as a treater. A free water knock out may also separate gasses from the liquids.

A "treater" would be understood to refer to a separator that uses, for example: mechanical, centrifugal type, heat, gravity segregation, electric current, a chemical additive, or any combination thereof, to break or reduce the emulsion. A treater may also separate gasses from the liquids.

If the amount of organosulfur enriched liquid hydrocarbon (20) is insufficient to separate the produced water (26) from the mixture of organosulfur enriched liquid hydrocarbon and bitumen-based liquid, then additional liquid hydrocarbon (30) is added. The additional liquid hydrocarbon (30) may be added to: the emulsion (24), the organosulfur enriched liquid hydrocarbon (20), the organosulfur enriched liquid hydrocarbon and bitumen-based liquid mixture, a product stream from a component of the separator, or any combination thereof.

Volatile compounds produced by the liquid/liquid separation may be treated with liquid hydrocarbon, for example by being directed back to the absorber (12). Volatile compounds may be directed back to the absorber with, for example, the separated gas (34) from the inlet degasser (32). One or more components of the separator may be operated at an elevated pressure to keep volatile compounds in the liquid stream. The elevated pressure may be the system pressure. In such systems, the separator may include an outlet degasser (38) that degasses the bitumen-based mixture, producing gas which may also be treated with liquid hydrocarbon. An outlet degasser may be included in separators that are operated at atmospheric pressure. Outlet degassers may be operated at a reduced pressure. As illustrated in FIG. 2, the gas produced by the outlet degasser is mixed with the separated gas (34) and directed back to the absorber (12).

Changing the chain length of the liquid hydrocarbon may affect the sulfur removal process. For example, increasing the chain length of the liquid hydrocarbon may change the efficiency of removal of the organosulfur compounds from the oil sands produced gas, reduce losses of the liquid hydrocarbon into a gas stream, or both.

The liquid hydrocarbon used in the absorber to remove at least a portion of the organosulfur compounds from the oil sands produced gas may be a $C_3$-$C_{30}$ hydrocarbon mixture. Some systems or processes according to the present disclosure may use a $C_4$-$C_{20}$ hydrocarbon mixture in the absorber.

The absorber may be operated at pressures between about 200 and about 2,500 kPag. Operation at a lower pressure may be desirable in order to eliminate the capital cost of compression. Operation at a higher pressure may enhance removal of the organosulfur compounds from the oil sands produced gas but may increase the requirement to recycle lighter components in the system and may impact the size of vapour recovery equipment required for the outlet degasser vapour stream. In particular examples, the absorber is operated at pressures between about 500 and about 2,500 kPag. The absorber may be operated at a plurality of different pressures. For example, the absorber may include both high and low pressure contactors.

The temperature of the oil sands produced gas provided to the absorber may be in the range of about 5 to about 60° C.

In particular examples, the oil sands produced gas temperature is 40° C. based on the assumptions of an upstream air cooler and summer ambient temperatures. Alternatively, the oil sands produced gas temperature may be cooler depending on the availability of alternate cooling sources such as diluent, make-up water or refrigerant. The temperature of the liquid hydrocarbon provided to the absorber should preferably be at least 5° C. higher than the temperature of the oil sands produced gas provided to the absorber to prevent condensation of a compound that may contribute to foaming, for example organosulfur compounds, which could cause foaming or fouling in the absorber.

As the liquid/gas ratio is increased in the absorber, the absorption efficiency of the organosulfur compounds increases. However, more $H_2S$ and methane are also absorbed into the liquid hydrocarbon, which results in a larger amount of gas from the separator. A larger volume of $H_2S$ and methane, if separated from the bitumen-based mixture, may reduce the efficiency with which organosulfur compounds are removed. The larger volume of $H_2S$ and methane may need to be directed back into the system upstream of the absorber, may increase the size of the vapour recovery system required, and may reduce the ratio of hydrocarbon liquid to gas (which includes oil sands produced gas and separated gas).

It may be advantageous in some systems or processes according to the present disclosure to operate the absorber at a liquid/gas ratio of about 0.0001 to about 0.015 actual $m^3$ liquid hydrocarbon/standard $m^3$ gas.

In particular examples, the absorber may be operated at about 0.0004 to about 0.007 actual $m^3$ liquid hydrocarbon/standard $m^3$ gas.

Figure 3:
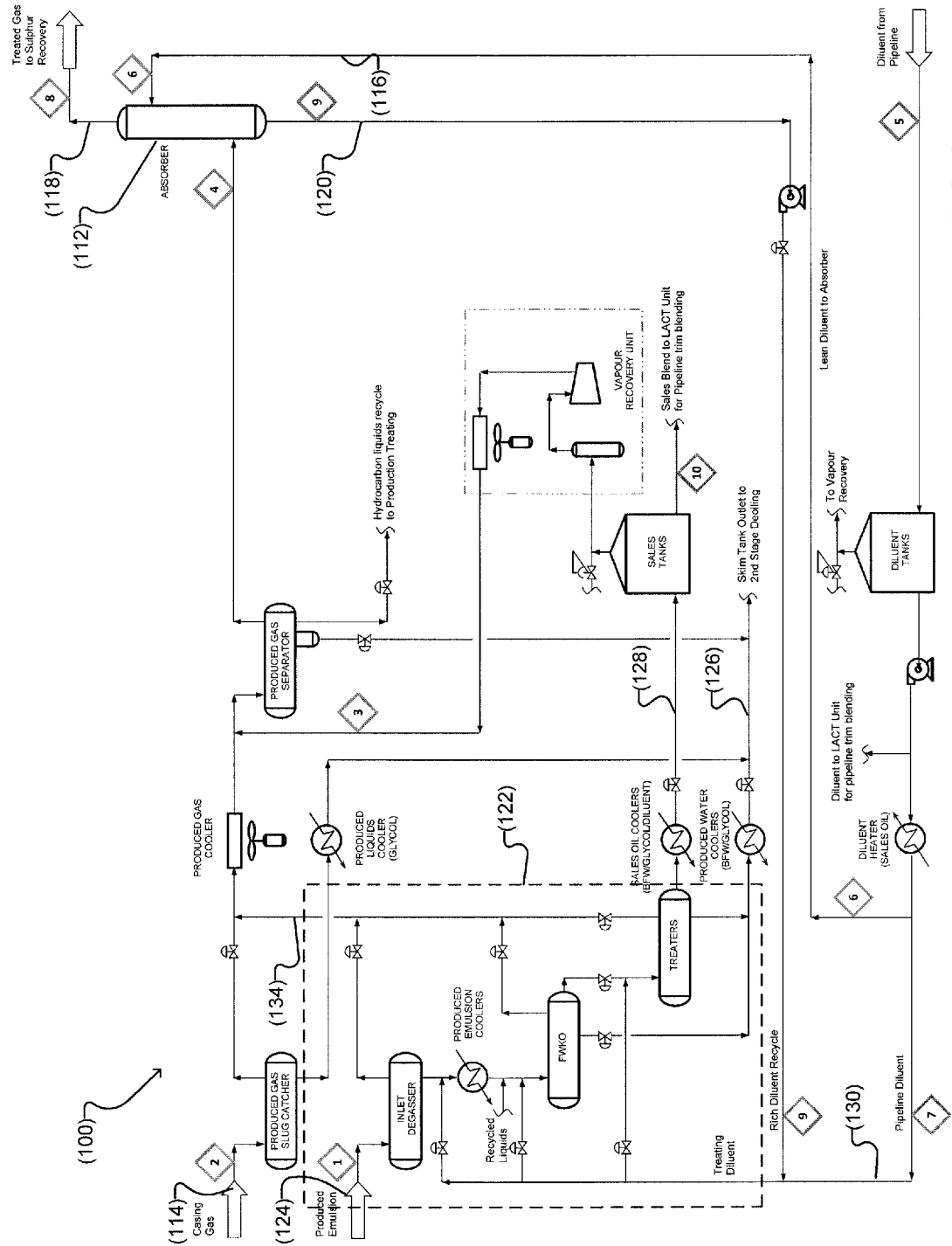
FIG. 3 is an illustration of an example low pressure system according to the present disclosure.
Figure 4:
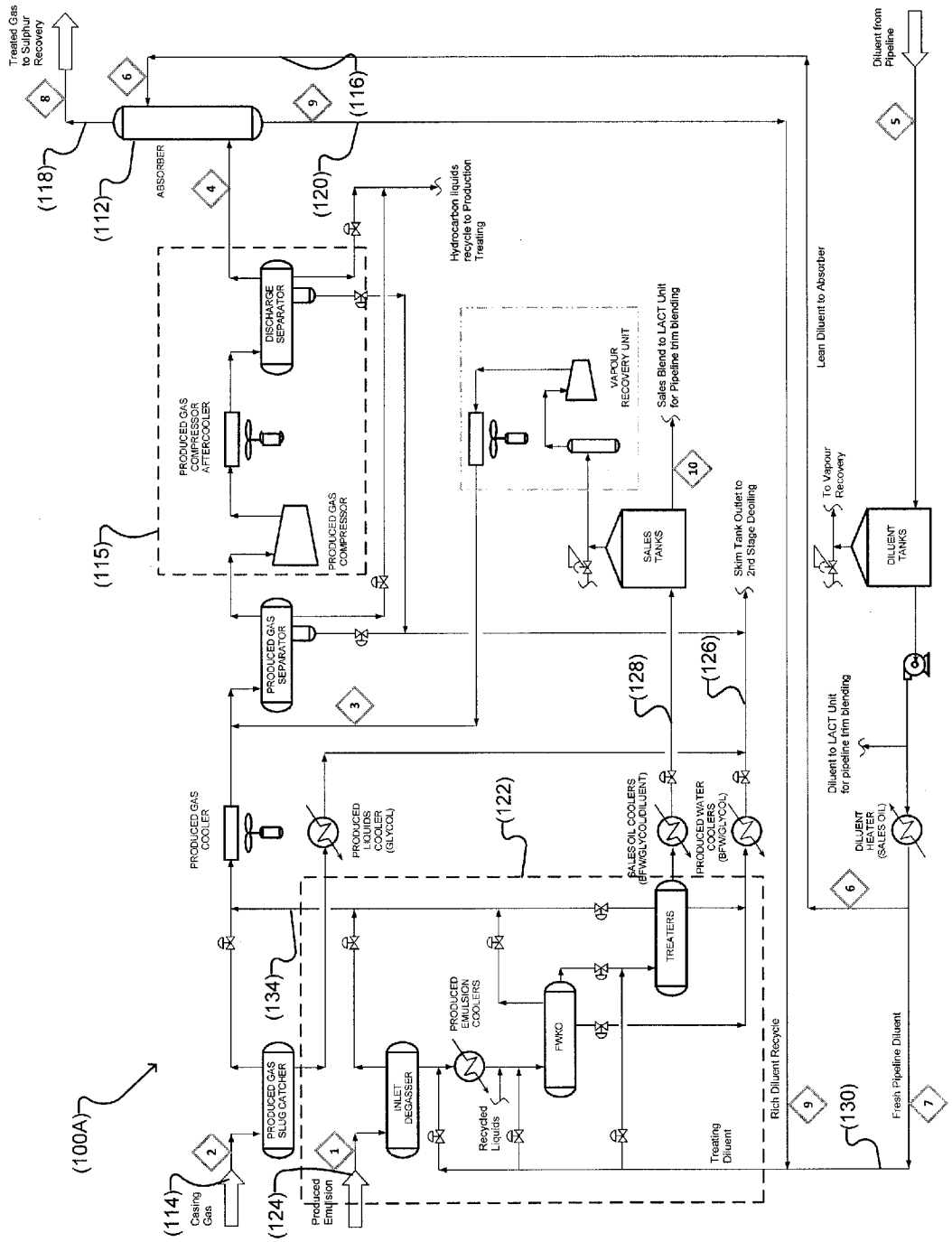
FIG. 4 is an illustration of an example high pressure system according to the present disclosure.

The process was simulated as shown in FIGS. 3 and 4. FIG. 3 represents an example of a low pressure system (100) according to one embodiment. The system (100) comprises an absorber (112) which may be substantially similar to the absorber (12) discussed above. Oil sands produced gas (114) passes through a slug catcher, control valve, cooler and a gas separator en route to the absorber (112). Separated gas (134) from a separator (122) is also provided to the absorber (112) along with the oil sands produced gas (114). The absorber (112) is provided with liquid hydrocarbon (116), and produces an organosulfur depleted gas (118) and an organosulfur enriched liquid hydrocarbon (120). The separator (122) receives the organosulfur enriched liquid hydrocarbon (120) and an emulsion (124). In the illustrated example, the separator (122) comprises an inlet degasser, a free water knock out, and one or more treaters. The separator (122) outputs produced water (126) and the bitumen-based mixture (128) as described above. Additional degassing may also be performed downstream from the separator (122).

In the system (100) of FIG. 3, the pressure of the absorber depends on the system inlet pressure profile (reflecting the pressures of the emulsion (124) and oil sands produced gas (114) streams, also indicated with diamonds 1 and 2, respectively, and the upstream pressure drop from control valves, cooler, etc.). The simulated absorber pressure was 500 kPag. In this low pressure example, there is no compression equipment (e.g., including a compressor, cooler or discharge separator). In the illustrated low pressure configuration there are two inlet streams: oil sands produced gas (114) and emulsion (124). Alternatively, both streams could enter the system as one.

FIG. 4 represents a high pressure system (100A) according to another embodiment. The system (100A) of FIG. 4 is substantially similar to the system (100) of FIG. 3, except that the pressure of the gas provided to the absorber (112) is increased by the addition of compression equipment (115). The compression equipment may, for example, include a compressor, aftercooler and discharge separator. In the high pressure example, both 2,000 kPag and 2,500 kPag absorber pressures were evaluated, as discussed below.

Figure 5:
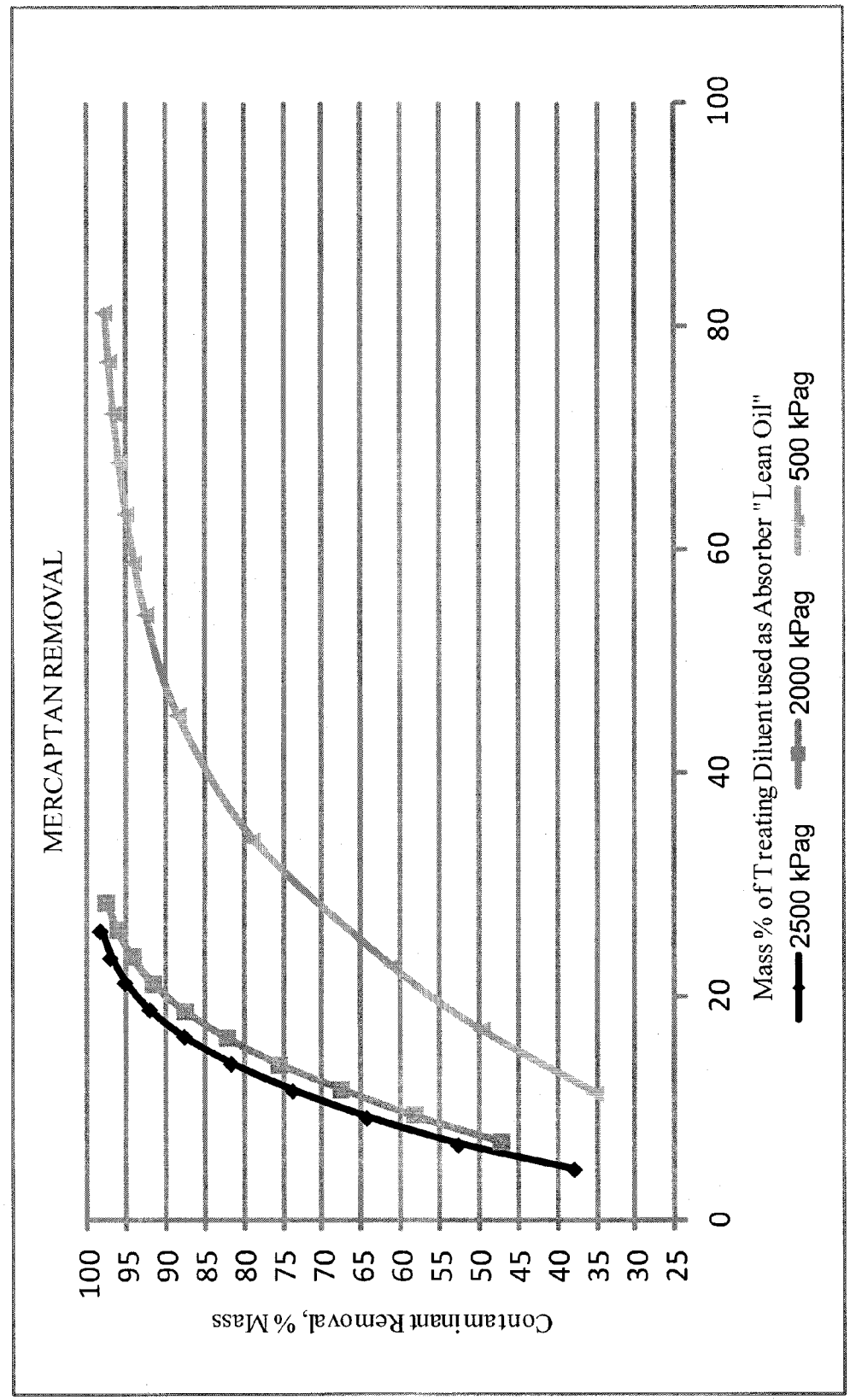
FIG. 5 is a graph showing the mass % recovery of organosulfur compounds at different pressures and different fractions of organosulfur enriched liquid hydrocarbon to total liquid hydrocarbon.
Figure 6:
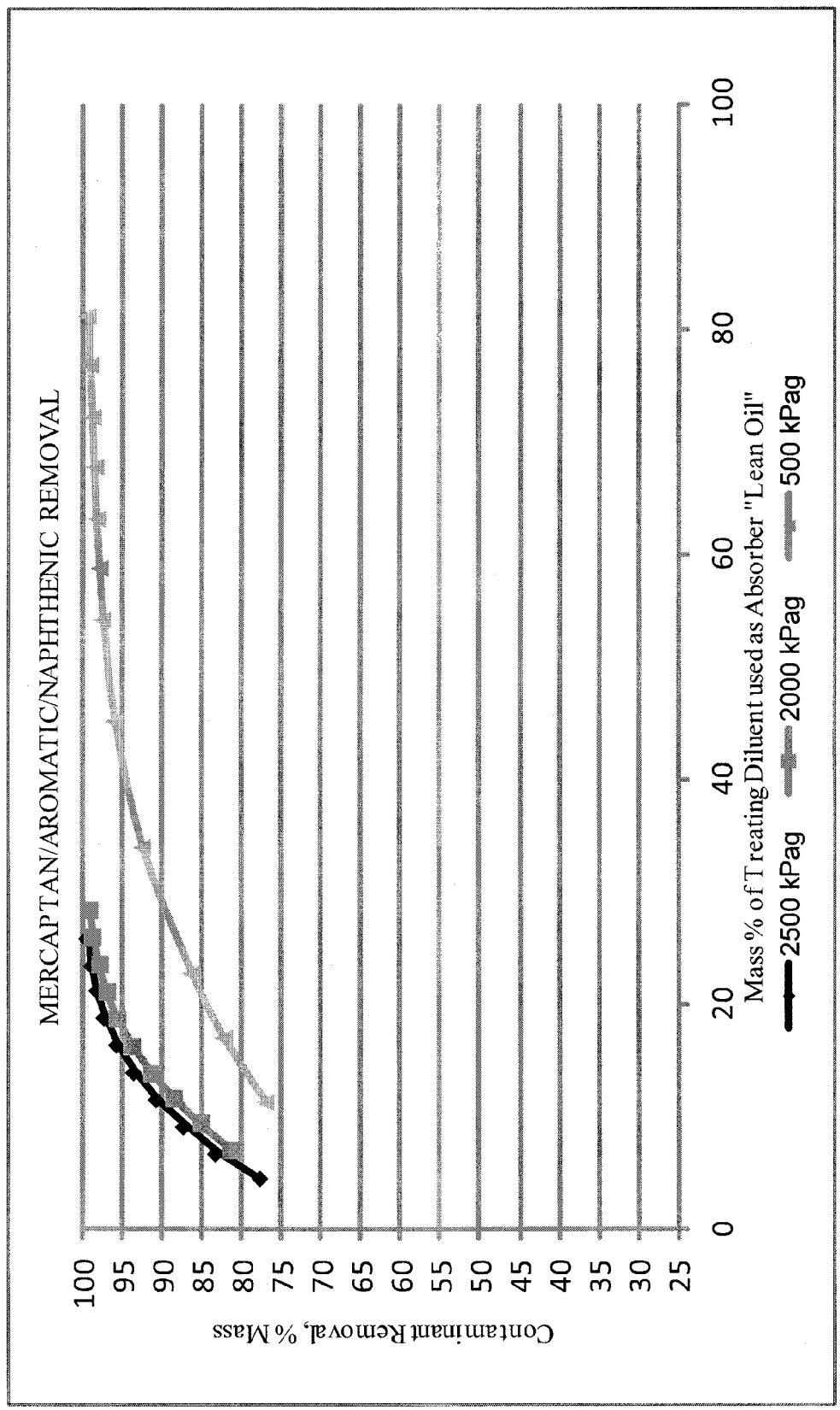
FIG. 6 is a graph showing the mass % recovery of contaminant compounds at different pressures and different fractions of organosulfur enriched liquid hydrocarbon to total liquid hydrocarbon.

By simulation, the liquid hydrocarbon to gas ratio was varied at each absorber pressure (500, 2,000, and 2,500 kPag) to create the three curves shown in each of FIGS. 5 and 6. Key simulation parameters included:
1) an absorber modelled with 10 theoretical stages;
2) use of the Peng Robinson fluid package;
3) normal boiling point hypotheticals (NBPs) created based on assay information from condensate diluent analysis;
4) sulfur speciation based on a typical plant produced gas analysis; and
5) inlet streams defined assuming a plant steam to oil ratio (SOR) of 1.8 and a gas to oil ratio (GOR) of 11.

The amount of organosulfur compounds removed from an oil sands produced gas is illustrated in FIGS. 5 and 6. FIG. 5 is a graph showing the mass % of organosulfur compounds (y-axis) removed as a function of the fraction (as mass %) of organosulfur enriched liquid hydrocarbon to total amount of liquid hydrocarbon used to separate the produced water from the bitumen-based mixture in the separator (x-axis). That is, the fraction=(mass of liquid hydrocarbon used in the absorber)/(mass of liquid hydrocarbon used in the absorber+ additional liquid hydrocarbon). FIG. 5 illustrates the absorber at three different operating pressures: 500 kPag, 2,000 kPag and 2,500 kPag.

FIG. 6 is a graph showing the mass % of organosulfur, aromatic and naphthenic compounds (y-axis) removed as a function of the fraction (as mass %) of organosulfur enriched liquid hydrocarbon to total amount of liquid hydrocarbon used to separate the produced water from the bitumen-based mixture in the separator (x-axis). That is, the fraction=(mass of liquid hydrocarbon used in the absorber)/(mass of liquid hydrocarbon used in the absorber+additional liquid hydrocarbon). FIG. 6 illustrates the absorber at three different operating pressures: 500 kPag, 2,000 kPag and 2,500 kPag.

Both FIGS. 5 and 6 indicate that at higher pressures less liquid hydrocarbon is needed to absorb the organosulfur compounds. This is reflected by the reduction in the required fraction of organosulfur enriched liquid hydrocarbon to total amount of liquid hydrocarbon as the pressure is raised from 500 kPag to 2,500 kPag.

Material balance data for the highest point on each curve in FIGS. 5 and 6 is shown in Tables 1 (500 kPag), 2 (2,000 kPag), and 3 (2,500 kPag). The stream numbers across the tops of Tables 1-3 refer to the reference numerals in diamonds in FIG. 3 (in the case of Table 1) and FIG. 4 (in the case of Tables 2 and 3).

Table 1 (500 kPag) provides a molar balance for the system utilizing 81.4 mass % liquid hydrocarbon at a mass flow rate of 36,000 kg/h to the absorber, achieving 97.8 mass % removal of organosulfur compounds and 99.2 mass % removal of organosulfur, aromatic and naphthenic compounds.

Table 2 (2,000 kPag) provides a molar balance for the system utilizing 28.3 mass % liquid hydrocarbon at a mass flow rate of 12,000 kg/h to the absorber, achieving 97.4 mass % removal of organosulfur compounds and 99.1 mass % removal of organosulfur, aromatic and naphthenic compounds.

Table 3 (2,500 kPag) provides a molar balance for the system utilizing 25.9 mass % liquid hydrocarbon at a mass flow rate of 11,000 kg/h to the absorber, achieving 98.1 mass % removal of organosulfur compounds and 99.3 mass % removal of organosulfur, aromatic and naphthenic compounds.

TABLE 1

Low Pressure Operation Material Balance - 500 kPag Absorber Pressure

| Stream Number | 1 | 2 | 3 | 4 | 5 | 6 |
|---|---|---|---|---|---|---|
| Name | Produced Emulsion | Casing Gas | Recovered Gas | Absorber Gas Inlet | Pipeline Diluent | Lean Diluent |
| Temperature (C.) | 196.5 | 169.0 | 40.0 | 39.5 | 15.0 | 40.6 |
| Pressure (kPag) | 1600 | 800 | 700 | 500 | 200 | 500 |
| Molar Flow (kgmole/h) | 37,680.0 | 1,170.0 | 24.7 | 326.4 | 849.9 | 378.2 |
| Mass Flow (kg/h) | 998,800 | 23,960 | 1,014 | 6,794 | 80,910 | 36,000 |
| COMPONENT MOLE FRACTION | | | | | | |
| $H_2O$ | 0.97736 | 0.87928 | 0.07647 | 0.01088 | 0.00000 | 0.00000 |
| Hydrogen | 0.00003 | 0.00254 | 0.00126 | 0.01304 | 0.00000 | 0.00000 |
| Helium | 0.00000 | 0.00015 | 0.00016 | 0.00082 | 0.00000 | 0.00000 |
| Nitrogen | 0.00005 | 0.00198 | 0.00246 | 0.01313 | 0.00000 | 0.00000 |
| $CO_2$ | 0.00032 | 0.01980 | 0.07641 | 0.10782 | 0.00000 | 0.00000 |
| Methane | 0.00429 | 0.08192 | 0.41489 | 0.80894 | 0.00190 | 0.00190 |
| Ethane | 0.00002 | 0.00191 | 0.01925 | 0.01068 | 0.00140 | 0.00140 |
| Propane | 0.00001 | 0.00056 | 0.02096 | 0.00421 | 0.00750 | 0.00750 |
| i-Butane | 0.00000 | 0.00011 | 0.01282 | 0.00144 | 0.00970 | 0.00970 |
| n-Butane | 0.00001 | 0.00033 | 0.05918 | 0.00555 | 0.04760 | 0.04760 |
| i-Pentane | 0.00000 | 0.00011 | 0.12133 | 0.00773 | 0.15890 | 0.15890 |
| n-Pentane | 0.00000 | 0.00013 | 0.10269 | 0.00627 | 0.16520 | 0.16520 |
| n-Hexane | 0.00000 | 0.00014 | 0.00015 | 0.00040 | 0.00000 | 0.00000 |
| n-Heptane | 0.00000 | 0.00009 | 0.00004 | 0.00013 | 0.00000 | 0.00000 |
| n-Octane | 0.00000 | 0.00004 | 0.00001 | 0.00002 | 0.00000 | 0.00000 |
| n-Nonane | 0.00000 | 0.00002 | 0.00000 | 0.00001 | 0.00000 | 0.00000 |
| n-Decane | 0.00001 | 0.00013 | 0.00000 | 0.00001 | 0.00000 | 0.00000 |
| 22-Mpropane | 0.00000 | 0.00000 | 0.00162 | 0.00011 | 0.00150 | 0.00150 |

TABLE 1-continued

Low Pressure Operation Material Balance - 500 kPag Absorber Pressure

| | | | | | | | |
|---|---|---|---|---|---|---|---|
| Sulphur Components | H₂S | 0.00003 | 0.00068 | 0.00614 | 0.00508 | 0.00000 | 0.00000 |
| | M-Mercaptan | 0.00000 | 0.00005 | 0.00000 | 0.00014 | 0.00000 | 0.00000 |
| | E-Mercaptan | 0.00000 | 0.00001 | 0.00000 | 0.00002 | 0.00000 | 0.00000 |
| | diMdiSulphide | 0.00000 | 0.00000 | 0.00000 | 0.00000 | 0.00000 | 0.00000 |
| | 2C3Mercaptan | 0.00000 | 0.00000 | 0.00000 | 0.00001 | 0.00000 | 0.00000 |
| | nPMercaptan | 0.00000 | 0.00000 | 0.00000 | 0.00001 | 0.00000 | 0.00000 |
| Naphthenic and Aromatic Components | Cyclopentane | 0.00000 | 0.00002 | 0.00006 | 0.00010 | 0.00000 | 0.00000 |
| | Mcyclopentan | 0.00000 | 0.00001 | 0.00002 | 0.00004 | 0.00000 | 0.00000 |
| | Cyclohexane | 0.00000 | 0.00001 | 0.00001 | 0.00002 | 0.00000 | 0.00000 |
| | Mcyclohexane | 0.00000 | 0.00001 | 0.00001 | 0.00002 | 0.00000 | 0.00000 |
| | Benzene | 0.00000 | 0.00001 | 0.00002 | 0.00003 | 0.00000 | 0.00000 |
| | Toluene | 0.00000 | 0.00001 | 0.00000 | 0.00001 | 0.00000 | 0.00000 |
| | E-Benzene | 0.00000 | 0.00000 | 0.00000 | 0.00000 | 0.00000 | 0.00000 |
| | p-Xylene | 0.00000 | 0.00000 | 0.00000 | 0.00000 | 0.00000 | 0.00000 |
| | o-Xylene | 0.00000 | 0.00000 | 0.00000 | 0.00000 | 0.00000 | 0.00000 |
| | m-Xylene | 0.00000 | 0.00000 | 0.00000 | 0.00000 | 0.00000 | 0.00000 |
| | 124-MBenzene | 0.00000 | 0.00000 | 0.00000 | 0.00000 | 0.00000 | 0.00000 |
| Bitumen Hypothetical Components | NBP 177 | 0.00021 | 0.00205 | 0.00007 | 0.00016 | 0.00000 | 0.00000 |
| | NBP 191 | 0.00023 | 0.00172 | 0.00004 | 0.00007 | 0.00000 | 0.00000 |
| | NBP 205 | 0.00025 | 0.00143 | 0.00002 | 0.00003 | 0.00000 | 0.00000 |
| | NBP 220 | 0.00028 | 0.00116 | 0.00001 | 0.00001 | 0.00000 | 0.00000 |
| | NBP 234 | 0.00031 | 0.00095 | 0.00001 | 0.00001 | 0.00000 | 0.00000 |
| | NBP 248 | 0.00034 | 0.00076 | 0.00000 | 0.00000 | 0.00000 | 0.00000 |
| | NBP 263 | 0.00036 | 0.00057 | 0.00000 | 0.00000 | 0.00000 | 0.00000 |
| | NBP 277 | 0.00039 | 0.00042 | 0.00000 | 0.00000 | 0.00000 | 0.00000 |
| | NBP 291 | 0.00042 | 0.00031 | 0.00000 | 0.00000 | 0.00000 | 0.00000 |
| | NBP 305 | 0.00044 | 0.00022 | 0.00000 | 0.00000 | 0.00000 | 0.00000 |
| | NBP 320 | 0.00045 | 0.00015 | 0.00000 | 0.00000 | 0.00000 | 0.00000 |
| | NBP 334 | 0.00046 | 0.00009 | 0.00000 | 0.00000 | 0.00000 | 0.00000 |
| | NBP 348 | 0.00047 | 0.00006 | 0.00000 | 0.00000 | 0.00000 | 0.00000 |
| | NBP 363 | 0.00047 | 0.00003 | 0.00000 | 0.00000 | 0.00000 | 0.00000 |
| | NBP 377 | 0.00048 | 0.00002 | 0.00000 | 0.00000 | 0.00000 | 0.00000 |
| | NBP 391 | 0.00049 | 0.00001 | 0.00000 | 0.00000 | 0.00000 | 0.00000 |
| | NBP 406 | 0.00050 | 0.00000 | 0.00000 | 0.00000 | 0.00000 | 0.00000 |
| | NBP 420 | 0.00051 | 0.00000 | 0.00000 | 0.00000 | 0.00000 | 0.00000 |
| | NBP 441 | 0.00101 | 0.00000 | 0.00000 | 0.00000 | 0.00000 | 0.00000 |
| | NBP 469-684 | 0.00978 | 0.00000 | 0.00000 | 0.00000 | 0.00000 | 0.00000 |
| Diluent Hypothetical Components | NBP 50 | 0.00000 | 0.00000 | 0.01658 | 0.00080 | 0.03950 | 0.03950 |
| | NBP 59 | 0.00000 | 0.00000 | 0.02722 | 0.00118 | 0.08498 | 0.08498 |
| | NBP 71 | 0.00000 | 0.00000 | 0.01858 | 0.00066 | 0.08569 | 0.08569 |
| | NBP 87 | 0.00000 | 0.00000 | 0.01187 | 0.00029 | 0.09772 | 0.09772 |
| | NBP 100 | 0.00000 | 0.00000 | 0.00544 | 0.00010 | 0.07103 | 0.07103 |
| | NBP 117 | 0.00000 | 0.00000 | 0.00309 | 0.00003 | 0.07898 | 0.07898 |
| | NBP 131 | 0.00000 | 0.00000 | 0.00053 | 0.00000 | 0.02372 | 0.02372 |
| | NBP 147 | 0.00000 | 0.00000 | 0.00044 | 0.00000 | 0.04044 | 0.04044 |
| | NBP 161 | 0.00000 | 0.00000 | 0.00007 | 0.00000 | 0.01123 | 0.01123 |
| | NBP 174 | 0.00000 | 0.00000 | 0.00007 | 0.00000 | 0.02154 | 0.02154 |
| | NBP 190 | 0.00000 | 0.00000 | 0.00001 | 0.00000 | 0.00655 | 0.00655 |
| | NBP 204 | 0.00000 | 0.00000 | 0.00000 | 0.00000 | 0.00475 | 0.00475 |
| | NBP 218 | 0.00000 | 0.00000 | 0.00000 | 0.00000 | 0.00488 | 0.00488 |
| | NBP 232 | 0.00000 | 0.00000 | 0.00000 | 0.00000 | 0.00427 | 0.00427 |
| | NBP 247-440 | 0.00000 | 0.00000 | 0.00000 | 0.00000 | 0.03102 | 0.03102 |
| | Total: | 1.00000 | 1.00000 | 1.00000 | 1.00000 | 1.00000 | 1.00000 |

| Stream Number | 7 | 8 | 9 | 10 |
|---|---|---|---|---|
| Name | Add'l Treating Diluent | Treated Gas | Rich Diluent | Sales Oil |
| Temperature (C.) | 40.0 | 38.4 | 23.5 | 39.9 |
| Pressure (kPag) | 1900 | 400 | 500 | 0 |
| Molar Flow (kgmole/h) | 122.6 | 368.0 | 336.5 | 1,145.0 |
| Mass Flow (kg/h) | 11,670 | 10,240 | 32,550 | 378,300 |
| COMPONENT MOLE FRACTION | | | | |
| H₂O | 0.00000 | 0.00879 | 0.00094 | 0.01463 |
| Hydrogen | 0.00000 | 0.01152 | 0.00005 | 0.00000 |
| Helium | 0.00000 | 0.00072 | 0.00001 | 0.00000 |
| Nitrogen | 0.00000 | 0.01154 | 0.00012 | 0.00000 |
| CO₂ | 0.00000 | 0.08756 | 0.00882 | 0.00084 |
| Methane | 0.00190 | 0.69765 | 0.02380 | 0.00142 |
| Ethane | 0.00140 | 0.00927 | 0.00179 | 0.00032 |
| Propane | 0.00750 | 0.00919 | 0.00246 | 0.00114 |
| i-Butane | 0.00970 | 0.00844 | 0.00306 | 0.00171 |
| n-Butane | 0.04760 | 0.03273 | 0.02308 | 0.01080 |

TABLE 1-continued

Low Pressure Operation Material Balance - 500 kPag Absorber Pressure

|  |  |  |  |  |  |
|---|---|---|---|---|---|
|  | i-Pentane | 0.15890 | 0.04902 | 0.13245 | 0.05389 |
|  | n-Pentane | 0.16520 | 0.03936 | 0.14867 | 0.05980 |
|  | n-Hexane | 0.00000 | 0.00000 | 0.00039 | 0.00027 |
|  | n-Heptane | 0.00000 | 0.00000 | 0.00013 | 0.00019 |
|  | n-Octane | 0.00000 | 0.00000 | 0.00002 | 0.00009 |
|  | n-Nonane | 0.00000 | 0.00000 | 0.00001 | 0.00006 |
|  | n-Decane | 0.00000 | 0.00000 | 0.00001 | 0.00057 |
|  | 22-Mpropane | 0.00150 | 0.00080 | 0.00092 | 0.00040 |
| Sulphur | $H_2S$ | 0.00000 | 0.00344 | 0.00116 | 0.00019 |
| Components | M-Mercaptan | 0.00000 | 0.00000 | 0.00014 | 0.00011 |
|  | E-Mercaptan | 0.00000 | 0.00000 | 0.00002 | 0.00002 |
|  | diMdiSulphide | 0.00000 | 0.00000 | 0.00000 | 0.00000 |
|  | 2C3Mercaptan | 0.00000 | 0.00000 | 0.00001 | 0.00000 |
|  | nPMercaptan | 0.00000 | 0.00000 | 0.00001 | 0.00000 |
| Naphthenic | Cyclopentane | 0.00000 | 0.00000 | 0.00009 | 0.00005 |
| and Aromatic | Mcyclopentan | 0.00000 | 0.00000 | 0.00004 | 0.00003 |
| Components | Cyclohexane | 0.00000 | 0.00000 | 0.00002 | 0.00002 |
|  | Mcyclohexane | 0.00000 | 0.00000 | 0.00002 | 0.00003 |
|  | Benzene | 0.00000 | 0.00000 | 0.00003 | 0.00003 |
|  | Toluene | 0.00000 | 0.00000 | 0.00001 | 0.00002 |
|  | E-Benzene | 0.00000 | 0.00000 | 0.00000 | 0.00000 |
|  | p-Xylene | 0.00000 | 0.00000 | 0.00000 | 0.00001 |
|  | o-Xylene | 0.00000 | 0.00000 | 0.00000 | 0.00000 |
|  | m-Xylene | 0.00000 | 0.00000 | 0.00000 | 0.00000 |
|  | 124-MBenzene | 0.00000 | 0.00000 | 0.00000 | 0.00000 |
| Bitumen | NBP 177 | 0.00000 | 0.00000 | 0.00015 | 0.00887 |
| Hypothetical | NBP 191 | 0.00000 | 0.00000 | 0.00007 | 0.00918 |
| Components | NBP 205 | 0.00000 | 0.00000 | 0.00003 | 0.00968 |
|  | NBP 220 | 0.00000 | 0.00000 | 0.00001 | 0.01026 |
|  | NBP 234 | 0.00000 | 0.00000 | 0.00001 | 0.01113 |
|  | NBP 248 | 0.00000 | 0.00000 | 0.00000 | 0.01208 |
|  | NBP 263 | 0.00000 | 0.00000 | 0.00000 | 0.01251 |
|  | NBP 277 | 0.00000 | 0.00000 | 0.00000 | 0.01325 |
|  | NBP 291 | 0.00000 | 0.00000 | 0.00000 | 0.01421 |
|  | NBP 305 | 0.00000 | 0.00000 | 0.00000 | 0.01477 |
|  | NBP 320 | 0.00000 | 0.00000 | 0.00000 | 0.01498 |
|  | NBP 334 | 0.00000 | 0.00000 | 0.00000 | 0.01526 |
|  | NBP 348 | 0.00000 | 0.00000 | 0.00000 | 0.01549 |
|  | NBP 363 | 0.00000 | 0.00000 | 0.00000 | 0.01551 |
|  | NBP 377 | 0.00000 | 0.00000 | 0.00000 | 0.01577 |
|  | NBP 391 | 0.00000 | 0.00000 | 0.00000 | 0.01610 |
|  | NBP 406 | 0.00000 | 0.00000 | 0.00000 | 0.01643 |
|  | NBP 420 | 0.00000 | 0.00000 | 0.00000 | 0.01685 |
|  | NBP 441 | 0.00000 | 0.00000 | 0.00000 | 0.03336 |
|  | NBP 469-684 | 0.00000 | 0.00000 | 0.00000 | 0.32207 |
| Diluent | NBP 50 | 0.03950 | 0.00604 | 0.03855 | 0.01533 |
| Hypothetical | NBP 59 | 0.08498 | 0.00974 | 0.08598 | 0.03404 |
| Components | NBP 71 | 0.08569 | 0.00655 | 0.08976 | 0.03538 |
|  | NBP 87 | 0.09772 | 0.00417 | 0.10553 | 0.04141 |
|  | NBP 100 | 0.07103 | 0.00192 | 0.07780 | 0.03046 |
|  | NBP 117 | 0.07898 | 0.00112 | 0.08756 | 0.03420 |
|  | NBP 131 | 0.02372 | 0.00020 | 0.02644 | 0.01031 |
|  | NBP 147 | 0.04044 | 0.00017 | 0.04525 | 0.01764 |
|  | NBP 161 | 0.01123 | 0.00003 | 0.01259 | 0.00491 |
|  | NBP 174 | 0.02154 | 0.00003 | 0.02417 | 0.00941 |
|  | NBP 190 | 0.00655 | 0.00000 | 0.00736 | 0.00287 |
|  | NBP 204 | 0.00475 | 0.00000 | 0.00533 | 0.00208 |
|  | NBP 218 | 0.00488 | 0.00000 | 0.00549 | 0.00214 |
|  | NBP 232 | 0.00427 | 0.00000 | 0.00480 | 0.00187 |
|  | NBP 247-440 | 0.03102 | 0.00000 | 0.03486 | 0.01357 |
|  | Total: | 1.00000 | 1.00000 | 1.00000 | 1.00000 |

TABLE 2

Elevated Pressure Operation Material Balance - 2000 kPag Absorber Pressure

| Stream Number | 1 | 2 | 3 | 4 | 5 | 6 |
|---|---|---|---|---|---|---|
| Name | Produced Emulsion | Casing Gas | Recovered Gas | Absorber Gas Inlet | Pipeline Diluent | Lean Diluent |
| Temperature (C.) | 196.5 | 169.0 | 40.0 | 40.0 | 15.0 | 40.0 |
| Pressure (kPag) | 1600 | 800 | 700 | 2000 | 200 | 2000 |
| Molar Flow (kgmole/h) | 37,680.0 | 1,170.0 | 36.8 | 334.1 | 815.1 | 126.1 |

TABLE 2-continued

Elevated Pressure Operation Material Balance - 2000 kPag Absorber Pressure

|  |  |  |  |  |  |  |  |
|---|---|---|---|---|---|---|---|
|  | Mass Flow (kg/h) | 998,800 | 23,960 | 1,588 | 7,199 | 77,600 | 12,000 |
|  | COMPONENT MOLE FRACTION | | | | | | |
|  | $H_2O$ | 0.97736 | 0.87928 | 0.07504 | 0.00388 | 0.00000 | 0.00000 |
|  | Hydrogen | 0.00003 | 0.00254 | 0.00110 | 0.01277 | 0.00000 | 0.00000 |
|  | Helium | 0.00000 | 0.00015 | 0.00014 | 0.00080 | 0.00000 | 0.00000 |
|  | Nitrogen | 0.00005 | 0.00198 | 0.00213 | 0.01289 | 0.00000 | 0.00000 |
|  | $CO_2$ | 0.00032 | 0.01980 | 0.06526 | 0.10693 | 0.00000 | 0.00000 |
|  | Methane | 0.00429 | 0.08192 | 0.36385 | 0.80019 | 0.00190 | 0.00190 |
|  | Ethane | 0.00002 | 0.00191 | 0.02208 | 0.01144 | 0.00140 | 0.00140 |
|  | Propane | 0.00001 | 0.00056 | 0.03830 | 0.00671 | 0.00750 | 0.00750 |
|  | i-Butane | 0.00000 | 0.00011 | 0.02337 | 0.00291 | 0.00970 | 0.00970 |
|  | n-Butane | 0.00001 | 0.00033 | 0.08755 | 0.01017 | 0.04760 | 0.04760 |
|  | i-Pentane | 0.00000 | 0.00011 | 0.12975 | 0.01175 | 0.15890 | 0.15890 |
|  | n-Pentane | 0.00000 | 0.00013 | 0.10482 | 0.00902 | 0.16520 | 0.16520 |
|  | n-Hexane | 0.00000 | 0.00014 | 0.00015 | 0.00039 | 0.00000 | 0.00000 |
|  | n-Heptane | 0.00000 | 0.00009 | 0.00004 | 0.00012 | 0.00000 | 0.00000 |
|  | n-Octane | 0.00000 | 0.00004 | 0.00001 | 0.00002 | 0.00000 | 0.00000 |
|  | n-Nonane | 0.00000 | 0.00002 | 0.00000 | 0.00000 | 0.00000 | 0.00000 |
|  | n-Decane | 0.00001 | 0.00013 | 0.00000 | 0.00001 | 0.00000 | 0.00000 |
|  | 22-Mpropane | 0.00000 | 0.00000 | 0.00207 | 0.00020 | 0.00150 | 0.00150 |
| Sulphur Components | $H_2S$ | 0.00003 | 0.00068 | 0.00548 | 0.00511 | 0.00000 | 0.00000 |
|  | M-Mercaptan | 0.00000 | 0.00005 | 0.00000 | 0.00014 | 0.00000 | 0.00000 |
|  | E-Mercaptan | 0.00000 | 0.00001 | 0.00000 | 0.00002 | 0.00000 | 0.00000 |
|  | diMdiSulphide | 0.00000 | 0.00000 | 0.00000 | 0.00000 | 0.00000 | 0.00000 |
|  | 2C3Mercaptan | 0.00000 | 0.00000 | 0.00000 | 0.00001 | 0.00000 | 0.00000 |
|  | nPMercaptan | 0.00000 | 0.00000 | 0.00000 | 0.00001 | 0.00000 | 0.00000 |
| Naphthenic and Aromatic Components | Cyclopentane | 0.00000 | 0.00002 | 0.00006 | 0.00010 | 0.00000 | 0.00000 |
|  | Mcyclopentan | 0.00000 | 0.00001 | 0.00002 | 0.00004 | 0.00000 | 0.00000 |
|  | Cyclohexane | 0.00000 | 0.00001 | 0.00001 | 0.00002 | 0.00000 | 0.00000 |
|  | Mcyclohexane | 0.00000 | 0.00001 | 0.00001 | 0.00002 | 0.00000 | 0.00000 |
|  | Benzene | 0.00000 | 0.00001 | 0.00002 | 0.00003 | 0.00000 | 0.00000 |
|  | Toluene | 0.00000 | 0.00001 | 0.00000 | 0.00001 | 0.00000 | 0.00000 |
|  | E-Benzene | 0.00000 | 0.00000 | 0.00000 | 0.00000 | 0.00000 | 0.00000 |
|  | p-Xylene | 0.00000 | 0.00000 | 0.00000 | 0.00000 | 0.00000 | 0.00000 |
|  | o-Xylene | 0.00000 | 0.00000 | 0.00000 | 0.00000 | 0.00000 | 0.00000 |
|  | m-Xylene | 0.00000 | 0.00000 | 0.00000 | 0.00000 | 0.00000 | 0.00000 |
|  | 124-MBenzene | 0.00000 | 0.00000 | 0.00000 | 0.00000 | 0.00000 | 0.00000 |
| Bitumen Hypothetical Components | NBP 177 | 0.00021 | 0.00205 | 0.00007 | 0.00010 | 0.00000 | 0.00000 |
|  | NBP 191 | 0.00023 | 0.00172 | 0.00004 | 0.00004 | 0.00000 | 0.00000 |
|  | NBP 205 | 0.00025 | 0.00143 | 0.00002 | 0.00001 | 0.00000 | 0.00000 |
|  | NBP 220 | 0.00028 | 0.00116 | 0.00001 | 0.00000 | 0.00000 | 0.00000 |
|  | NBP 234 | 0.00031 | 0.00095 | 0.00001 | 0.00000 | 0.00000 | 0.00000 |
|  | NBP 248 | 0.00034 | 0.00076 | 0.00000 | 0.00000 | 0.00000 | 0.00000 |
|  | NBP 263 | 0.00036 | 0.00057 | 0.00000 | 0.00000 | 0.00000 | 0.00000 |
|  | NBP 277 | 0.00039 | 0.00042 | 0.00000 | 0.00000 | 0.00000 | 0.00000 |
|  | NBP 291 | 0.00042 | 0.00031 | 0.00000 | 0.00000 | 0.00000 | 0.00000 |
|  | NBP 305 | 0.00044 | 0.00022 | 0.00000 | 0.00000 | 0.00000 | 0.00000 |
|  | NBP 320 | 0.00045 | 0.00015 | 0.00000 | 0.00000 | 0.00000 | 0.00000 |
|  | NBP 334 | 0.00046 | 0.00009 | 0.00000 | 0.00000 | 0.00000 | 0.00000 |
|  | NBP 348 | 0.00047 | 0.00006 | 0.00000 | 0.00000 | 0.00000 | 0.00000 |
|  | NBP 363 | 0.00047 | 0.00003 | 0.00000 | 0.00000 | 0.00000 | 0.00000 |
|  | NBP 377 | 0.00048 | 0.00002 | 0.00000 | 0.00000 | 0.00000 | 0.00000 |
|  | NBP 391 | 0.00049 | 0.00001 | 0.00000 | 0.00000 | 0.00000 | 0.00000 |
|  | NBP 406 | 0.00050 | 0.00000 | 0.00000 | 0.00000 | 0.00000 | 0.00000 |
|  | NBP 420 | 0.00051 | 0.00000 | 0.00000 | 0.00000 | 0.00000 | 0.00000 |
|  | NBP 441 | 0.00101 | 0.00000 | 0.00000 | 0.00000 | 0.00000 | 0.00000 |
|  | NBP 469-684 | 0.00978 | 0.00000 | 0.00000 | 0.00000 | 0.00000 | 0.00000 |
| Diluent Hypothetical Components | NBP 50 | 0.00000 | 0.00000 | 0.01607 | 0.00112 | 0.03950 | 0.03950 |
|  | NBP 59 | 0.00000 | 0.00000 | 0.02580 | 0.00160 | 0.08498 | 0.08498 |
|  | NBP 71 | 0.00000 | 0.00000 | 0.01724 | 0.00088 | 0.08569 | 0.08569 |
|  | NBP 87 | 0.00000 | 0.00000 | 0.01082 | 0.00038 | 0.09772 | 0.09772 |
|  | NBP 100 | 0.00000 | 0.00000 | 0.00491 | 0.00012 | 0.07103 | 0.07103 |
|  | NBP 117 | 0.00000 | 0.00000 | 0.00277 | 0.00004 | 0.07898 | 0.07898 |
|  | NBP 131 | 0.00000 | 0.00000 | 0.00047 | 0.00000 | 0.02372 | 0.02372 |
|  | NBP 147 | 0.00000 | 0.00000 | 0.00040 | 0.00000 | 0.04044 | 0.04044 |
|  | NBP 161 | 0.00000 | 0.00000 | 0.00006 | 0.00000 | 0.01123 | 0.01123 |
|  | NBP 174 | 0.00000 | 0.00000 | 0.00006 | 0.00000 | 0.02154 | 0.02154 |
|  | NBP 190 | 0.00000 | 0.00000 | 0.00001 | 0.00000 | 0.00655 | 0.00655 |
|  | NBP 204 | 0.00000 | 0.00000 | 0.00000 | 0.00000 | 0.00475 | 0.00475 |
|  | NBP 218 | 0.00000 | 0.00000 | 0.00000 | 0.00000 | 0.00488 | 0.00488 |
|  | NBP 232 | 0.00000 | 0.00000 | 0.00000 | 0.00000 | 0.00427 | 0.00427 |
|  | NBP 247-440 | 0.00000 | 0.00000 | 0.00000 | 0.00000 | 0.03102 | 0.03102 |
|  | Total: | 1.00000 | 1.00000 | 1.00000 | 1.00000 | 1.00000 | 1.00000 |

TABLE 2-continued

Elevated Pressure Operation Material Balance - 2000 kPag Absorber Pressure

| | Stream Number | 7 | 8 | 9 | 10 |
|---|---|---|---|---|---|
| | Name | Add'l Treating Diluent | Treated Gas | Rich Diluent | Sales Oil |
| | Temperature (C.) | 40.0 | 42.2 | 36.9 | 39.6 |
| | Pressure (kPag) | 1900 | 1900 | 2000 | 0 |
| | Molar Flow (kgmole/h) | 319.8 | 323.6 | 136.5 | 1,131.0 |
| | Mass Flow (kg/h) | 30,440 | 7,220 | 11,980 | 376,100 |
| COMPONENT MOLE FRACTION | | | | | |
| | $H_2O$ | 0.00000 | 0.00358 | 0.00100 | 0.01391 |
| | Hydrogen | 0.00000 | 0.01309 | 0.00022 | 0.00000 |
| | Helium | 0.00000 | 0.00082 | 0.00003 | 0.00000 |
| | Nitrogen | 0.00000 | 0.01312 | 0.00045 | 0.00000 |
| | $CO_2$ | 0.00000 | 0.09971 | 0.02530 | 0.00072 |
| | Methane | 0.00190 | 0.79367 | 0.07849 | 0.00125 |
| | Ethane | 0.00140 | 0.01016 | 0.00521 | 0.00037 |
| | Propane | 0.00750 | 0.00584 | 0.00950 | 0.00209 |
| | i-Butane | 0.00970 | 0.00304 | 0.00888 | 0.00312 |
| | n-Butane | 0.04760 | 0.01120 | 0.04231 | 0.01606 |
| | i-Pentane | 0.15890 | 0.01680 | 0.13565 | 0.05803 |
| | n-Pentane | 0.16520 | 0.01364 | 0.14229 | 0.06146 |
| | n-Hexane | 0.00000 | 0.00000 | 0.00094 | 0.00027 |
| | n-Heptane | 0.00000 | 0.00000 | 0.00030 | 0.00019 |
| | n-Octane | 0.00000 | 0.00000 | 0.00005 | 0.00009 |
| | n-Nonane | 0.00000 | 0.00000 | 0.00001 | 0.00006 |
| | n-Decane | 0.00000 | 0.00000 | 0.00002 | 0.00058 |
| | 22-Mpropane | 0.00150 | 0.00027 | 0.00123 | 0.00051 |
| Sulphur Components | $H_2S$ | 0.00000 | 0.00396 | 0.00310 | 0.00017 |
| | M-Mercaptan | 0.00000 | 0.00001 | 0.00033 | 0.00011 |
| | E-Mercaptan | 0.00000 | 0.00000 | 0.00005 | 0.00002 |
| | diMdiSulphide | 0.00000 | 0.00000 | 0.00000 | 0.00000 |
| | 2C3Mercaptan | 0.00000 | 0.00000 | 0.00002 | 0.00000 |
| | nPMercaptan | 0.00000 | 0.00000 | 0.00001 | 0.00000 |
| Naphthenic and Aromatic Components | Cyclopentane | 0.00000 | 0.00000 | 0.00023 | 0.00005 |
| | Mcyclopentan | 0.00000 | 0.00000 | 0.00009 | 0.00003 |
| | Cyclohexane | 0.00000 | 0.00000 | 0.00005 | 0.00002 |
| | Mcyclohexane | 0.00000 | 0.00000 | 0.00004 | 0.00003 |
| | Benzene | 0.00000 | 0.00000 | 0.00008 | 0.00003 |
| | Toluene | 0.00000 | 0.00000 | 0.00002 | 0.00002 |
| | E-Benzene | 0.00000 | 0.00000 | 0.00000 | 0.00000 |
| | p-Xylene | 0.00000 | 0.00000 | 0.00000 | 0.00001 |
| | o-Xylene | 0.00000 | 0.00000 | 0.00000 | 0.00000 |
| | m-Xylene | 0.00000 | 0.00000 | 0.00000 | 0.00000 |
| | 124-MBenzene | 0.00000 | 0.00000 | 0.00000 | 0.00000 |
| Bitumen Hypothetical Components | NBP 177 | 0.00000 | 0.00000 | 0.00025 | 0.00898 |
| | NBP 191 | 0.00000 | 0.00000 | 0.00009 | 0.00929 |
| | NBP 205 | 0.00000 | 0.00000 | 0.00003 | 0.00980 |
| | NBP 220 | 0.00000 | 0.00000 | 0.00001 | 0.01038 |
| | NBP 234 | 0.00000 | 0.00000 | 0.00000 | 0.01126 |
| | NBP 248 | 0.00000 | 0.00000 | 0.00000 | 0.01223 |
| | NBP 263 | 0.00000 | 0.00000 | 0.00000 | 0.01266 |
| | NBP 277 | 0.00000 | 0.00000 | 0.00000 | 0.01341 |
| | NBP 291 | 0.00000 | 0.00000 | 0.00000 | 0.01438 |
| | NBP 305 | 0.00000 | 0.00000 | 0.00000 | 0.01495 |
| | NBP 320 | 0.00000 | 0.00000 | 0.00000 | 0.01516 |
| | NBP 334 | 0.00000 | 0.00000 | 0.00000 | 0.01544 |
| | NBP 348 | 0.00000 | 0.00000 | 0.00000 | 0.01568 |
| | NBP 363 | 0.00000 | 0.00000 | 0.00000 | 0.01569 |
| | NBP 377 | 0.00000 | 0.00000 | 0.00000 | 0.01596 |
| | NBP 391 | 0.00000 | 0.00000 | 0.00000 | 0.01630 |
| | NBP 406 | 0.00000 | 0.00000 | 0.00000 | 0.01663 |
| | NBP 420 | 0.00000 | 0.00000 | 0.00000 | 0.01705 |
| | NBP 441 | 0.00000 | 0.00000 | 0.00000 | 0.03376 |
| | NBP 469-684 | 0.00000 | 0.00000 | 0.00000 | 0.32592 |
| Diluent Hypothetical Components | NBP 50 | 0.03950 | 0.00214 | 0.03416 | 0.01497 |
| | NBP 59 | 0.08498 | 0.00351 | 0.07409 | 0.03251 |
| | NBP 71 | 0.08569 | 0.00242 | 0.07553 | 0.03310 |
| | NBP 87 | 0.09772 | 0.00161 | 0.08736 | 0.03807 |
| | NBP 100 | 0.07103 | 0.00077 | 0.06408 | 0.02779 |
| | NBP 117 | 0.07898 | 0.00047 | 0.07193 | 0.03100 |
| | NBP 131 | 0.02372 | 0.00009 | 0.02171 | 0.00933 |
| | NBP 147 | 0.04044 | 0.00008 | 0.03716 | 0.01592 |
| | NBP 161 | 0.01123 | 0.00001 | 0.01034 | 0.00442 |
| | NBP 174 | 0.02154 | 0.00002 | 0.01985 | 0.00849 |

TABLE 2-continued

Elevated Pressure Operation Material Balance - 2000 kPag Absorber Pressure

|  |  |  |  |  |
|---|---|---|---|---|
| NBP 190 | 0.00655 | 0.00000 | 0.00605 | 0.00258 |
| NBP 204 | 0.00475 | 0.00000 | 0.00438 | 0.00187 |
| NBP 218 | 0.00488 | 0.00000 | 0.00451 | 0.00193 |
| NBP 232 | 0.00427 | 0.00000 | 0.00395 | 0.00168 |
| NBP 247-440 | 0.03102 | 0.00000 | 0.02865 | 0.01223 |
| Total: | 1.00000 | 1.00000 | 1.00000 | 1.00000 |

TABLE 3

Elevated Pressure Operation Material Balance - 2500 kPag Absorber Pressure

| | Stream Number | 1 | 2 | 3 | 4 | 5 | 6 |
|---|---|---|---|---|---|---|---|
| | Name | Produced Emulsion | Casing Gas | Recovered Gas | Absorber Gas Inlet | Pipeline Diluent | Lean Diluent |
| | Temperature (C.) | 196.5 | 169.0 | 40.0 | 40.0 | 15.0 | 40.0 |
| | Pressure (kPag) | 1600 | 800 | 700 | 2500 | 200 | 2500 |
| | Molar Flow (kgmole/h) | 37,680.0 | 1,170.0 | 37.9 | 337.7 | 813.5 | 115.5 |
| | Mass Flow (kg/h) | 998,800 | 23,960 | 1,643 | 7,340 | 77,450 | 11,000 |
| | COMPONENT MOLE FRACTION | | | | | | |
| | $H_2O$ | 0.97736 | 0.87928 | 0.07489 | 0.00321 | 0.00000 | 0.00000 |
| | Hydrogen | 0.00003 | 0.00254 | 0.00092 | 0.01265 | 0.00000 | 0.00000 |
| | Helium | 0.00000 | 0.00015 | 0.00013 | 0.00080 | 0.00000 | 0.00000 |
| | Nitrogen | 0.00005 | 0.00198 | 0.00194 | 0.01279 | 0.00000 | 0.00000 |
| | $CO_2$ | 0.00032 | 0.01980 | 0.06773 | 0.10686 | 0.00000 | 0.00000 |
| | Methane | 0.00429 | 0.08192 | 0.35869 | 0.79725 | 0.00190 | 0.00190 |
| | Ethane | 0.00002 | 0.00191 | 0.02263 | 0.01161 | 0.00140 | 0.00140 |
| | Propane | 0.00001 | 0.00056 | 0.03950 | 0.00711 | 0.00750 | 0.00750 |
| | i-Butane | 0.00000 | 0.00011 | 0.02380 | 0.00314 | 0.00970 | 0.00970 |
| | n-Butane | 0.00001 | 0.00033 | 0.08869 | 0.01096 | 0.04760 | 0.04760 |
| | i-Pentane | 0.00000 | 0.00011 | 0.12994 | 0.01279 | 0.15890 | 0.15890 |
| | n-Pentane | 0.00000 | 0.00013 | 0.10466 | 0.00984 | 0.16520 | 0.16520 |
| | n-Hexane | 0.00000 | 0.00014 | 0.00015 | 0.00038 | 0.00000 | 0.00000 |
| | n-Heptane | 0.00000 | 0.00009 | 0.00004 | 0.00012 | 0.00000 | 0.00000 |
| | n-Octane | 0.00000 | 0.00004 | 0.00001 | 0.00002 | 0.00000 | 0.00000 |
| | n-Nonane | 0.00000 | 0.00002 | 0.00000 | 0.00000 | 0.00000 | 0.00000 |
| | n-Decane | 0.00001 | 0.00013 | 0.00000 | 0.00001 | 0.00000 | 0.00000 |
| | 22-Mpropane | 0.00000 | 0.00000 | 0.00209 | 0.00022 | 0.00150 | 0.00150 |
| Sulphur Components | $H_2S$ | 0.00003 | 0.00068 | 0.00579 | 0.00514 | 0.00000 | 0.00000 |
| | M-Mercaptan | 0.00000 | 0.00005 | 0.00000 | 0.00014 | 0.00000 | 0.00000 |
| | E-Mercaptan | 0.00000 | 0.00001 | 0.00000 | 0.00002 | 0.00000 | 0.00000 |
| | diMdiSulphide | 0.00000 | 0.00000 | 0.00000 | 0.00000 | 0.00000 | 0.00000 |
| | 2C3Mercaptan | 0.00000 | 0.00000 | 0.00000 | 0.00001 | 0.00000 | 0.00000 |
| | nPMercaptan | 0.00000 | 0.00000 | 0.00000 | 0.00001 | 0.00000 | 0.00000 |
| Naphthenic and Aromatic Components | Cyclopentane | 0.00000 | 0.00002 | 0.00006 | 0.00009 | 0.00000 | 0.00000 |
| | Mcyclopentan | 0.00000 | 0.00001 | 0.00002 | 0.00003 | 0.00000 | 0.00000 |
| | Cyclohexane | 0.00000 | 0.00001 | 0.00001 | 0.00002 | 0.00000 | 0.00000 |
| | Mcyclohexane | 0.00000 | 0.00001 | 0.00001 | 0.00002 | 0.00000 | 0.00000 |
| | Benzene | 0.00000 | 0.00001 | 0.00002 | 0.00003 | 0.00000 | 0.00000 |
| | Toluene | 0.00000 | 0.00001 | 0.00000 | 0.00001 | 0.00000 | 0.00000 |
| | E-Benzene | 0.00000 | 0.00000 | 0.00000 | 0.00000 | 0.00000 | 0.00000 |
| | p-Xylene | 0.00000 | 0.00000 | 0.00000 | 0.00000 | 0.00000 | 0.00000 |
| | o-Xylene | 0.00000 | 0.00000 | 0.00000 | 0.00000 | 0.00000 | 0.00000 |
| | m-Xylene | 0.00000 | 0.00000 | 0.00000 | 0.00000 | 0.00000 | 0.00000 |
| | 124-MBenzene | 0.00000 | 0.00000 | 0.00000 | 0.00000 | 0.00000 | 0.00000 |
| Bitumen Hypothetical Components | NBP 177 | 0.00021 | 0.00205 | 0.00007 | 0.00008 | 0.00000 | 0.00000 |
| | NBP 191 | 0.00023 | 0.00172 | 0.00004 | 0.00003 | 0.00000 | 0.00000 |
| | NBP 205 | 0.00025 | 0.00143 | 0.00002 | 0.00001 | 0.00000 | 0.00000 |
| | NBP 220 | 0.00028 | 0.00116 | 0.00001 | 0.00000 | 0.00000 | 0.00000 |
| | NBP 234 | 0.00031 | 0.00095 | 0.00001 | 0.00000 | 0.00000 | 0.00000 |
| | NBP 248 | 0.00034 | 0.00076 | 0.00000 | 0.00000 | 0.00000 | 0.00000 |
| | NBP 263 | 0.00036 | 0.00057 | 0.00000 | 0.00000 | 0.00000 | 0.00000 |
| | NBP 277 | 0.00039 | 0.00042 | 0.00000 | 0.00000 | 0.00000 | 0.00000 |
| | NBP 291 | 0.00042 | 0.00031 | 0.00000 | 0.00000 | 0.00000 | 0.00000 |
| | NBP 305 | 0.00044 | 0.00022 | 0.00000 | 0.00000 | 0.00000 | 0.00000 |
| | NBP 320 | 0.00045 | 0.00015 | 0.00000 | 0.00000 | 0.00000 | 0.00000 |
| | NBP 334 | 0.00046 | 0.00009 | 0.00000 | 0.00000 | 0.00000 | 0.00000 |
| | NBP 348 | 0.00047 | 0.00006 | 0.00000 | 0.00000 | 0.00000 | 0.00000 |
| | NBP 363 | 0.00047 | 0.00003 | 0.00000 | 0.00000 | 0.00000 | 0.00000 |
| | NBP 377 | 0.00048 | 0.00002 | 0.00000 | 0.00000 | 0.00000 | 0.00000 |
| | NBP 391 | 0.00049 | 0.00001 | 0.00000 | 0.00000 | 0.00000 | 0.00000 |

TABLE 3-continued

Elevated Pressure Operation Material Balance - 2500 kPag Absorber Pressure

| | | | | | | | |
|---|---|---|---|---|---|---|---|
| Diluent Hypothetical Components | NBP 406 | 0.00050 | 0.00000 | 0.00000 | 0.00000 | 0.00000 | 0.00000 |
| | NBP 420 | 0.00051 | 0.00000 | 0.00000 | 0.00000 | 0.00000 | 0.00000 |
| | NBP 441 | 0.00101 | 0.00000 | 0.00000 | 0.00000 | 0.00000 | 0.00000 |
| | NBP 469-684 | 0.00978 | 0.00000 | 0.00000 | 0.00000 | 0.00000 | 0.00000 |
| | NBP 50 | 0.00000 | 0.00000 | 0.01600 | 0.00124 | 0.03950 | 0.03950 |
| | NBP 59 | 0.00000 | 0.00000 | 0.02565 | 0.00178 | 0.08498 | 0.08498 |
| | NBP 71 | 0.00000 | 0.00000 | 0.01712 | 0.00098 | 0.08569 | 0.08569 |
| | NBP 87 | 0.00000 | 0.00000 | 0.01073 | 0.00043 | 0.09772 | 0.09772 |
| | NBP 100 | 0.00000 | 0.00000 | 0.00491 | 0.00014 | 0.07103 | 0.07103 |
| | NBP 117 | 0.00000 | 0.00000 | 0.00275 | 0.00005 | 0.07898 | 0.07898 |
| | NBP 131 | 0.00000 | 0.00000 | 0.00047 | 0.00001 | 0.02372 | 0.02372 |
| | NBP 147 | 0.00000 | 0.00000 | 0.00039 | 0.00000 | 0.04044 | 0.04044 |
| | NBP 161 | 0.00000 | 0.00000 | 0.00006 | 0.00000 | 0.01123 | 0.01123 |
| | NBP 174 | 0.00000 | 0.00000 | 0.00006 | 0.00000 | 0.02154 | 0.02154 |
| | NBP 190 | 0.00000 | 0.00000 | 0.00001 | 0.00000 | 0.00655 | 0.00655 |
| | NBP 204 | 0.00000 | 0.00000 | 0.00000 | 0.00000 | 0.00475 | 0.00475 |
| | NBP 218 | 0.00000 | 0.00000 | 0.00000 | 0.00000 | 0.00488 | 0.00488 |
| | NBP 232 | 0.00000 | 0.00000 | 0.00000 | 0.00000 | 0.00427 | 0.00427 |
| | NBP 247-440 | 0.00000 | 0.00000 | 0.00000 | 0.00000 | 0.03102 | 0.03102 |
| | Total: | 1.00000 | 1.00000 | 1.00000 | 1.00000 | 1.00000 | 1.00000 |

| | Stream Number | 7 | 8 | 9 | 10 |
|---|---|---|---|---|---|
| | Name | Additional Treating Diluent | Treated Gas | Rich Diluent | Sales Oil |
| | Temperature (C.) | 40.3 | 43.4 | 39.6 | 39.5 |
| | Pressure (kPag) | 1900 | 2400 | 2500 | 0 |
| | Molar Flow (kgmole/h) | 327.0 | 321.0 | 132.3 | 1,129.0 |
| | Mass Flow (kg/h) | 31,130 | 7,054 | 11,290 | 375,900 |
| COMPONENT MOLE FRACTION | | | | | |
| | $H_2O$ | 0.00000 | 0.00298 | 0.00099 | 0.01304 |
| | Hydrogen | 0.00000 | 0.01320 | 0.00028 | 0.00000 |
| | Helium | 0.00000 | 0.00082 | 0.00004 | 0.00000 |
| | Nitrogen | 0.00000 | 0.01322 | 0.00056 | 0.00000 |
| | $CO_2$ | 0.00000 | 0.10012 | 0.02987 | 0.00074 |
| | Methane | 0.00190 | 0.80009 | 0.09551 | 0.00123 |
| | Ethane | 0.00140 | 0.01019 | 0.00613 | 0.00038 |
| | Propane | 0.00750 | 0.00558 | 0.01116 | 0.00217 |
| | i-Butane | 0.00970 | 0.00268 | 0.00997 | 0.00319 |
| | n-Butane | 0.04760 | 0.00981 | 0.04576 | 0.01638 |
| | i-Pentane | 0.15890 | 0.01489 | 0.13535 | 0.05824 |
| | n-Pentane | 0.16520 | 0.01214 | 0.13998 | 0.06153 |
| | n-Hexane | 0.00000 | 0.00000 | 0.00096 | 0.00027 |
| | n-Heptane | 0.00000 | 0.00000 | 0.00030 | 0.00019 |
| | n-Octane | 0.00000 | 0.00000 | 0.00005 | 0.00009 |
| | n-Nonane | 0.00000 | 0.00000 | 0.00001 | 0.00006 |
| | n-Decane | 0.00000 | 0.00000 | 0.00002 | 0.00058 |
| | 22-Mpropane | 0.00150 | 0.00024 | 0.00129 | 0.00052 |
| Sulphur Components | $H_2S$ | 0.00000 | 0.00392 | 0.00359 | 0.00018 |
| | M-Mercaptan | 0.00000 | 0.00000 | 0.00035 | 0.00011 |
| | E-Mercaptan | 0.00000 | 0.00000 | 0.00005 | 0.00002 |
| | diMdiSulphide | 0.00000 | 0.00000 | 0.00000 | 0.00000 |
| | 2C3Mercaptan | 0.00000 | 0.00000 | 0.00002 | 0.00000 |
| | nPMercaptan | 0.00000 | 0.00000 | 0.00001 | 0.00000 |
| Naphthenic and Aromatic Components | Cyclopentane | 0.00000 | 0.00000 | 0.00024 | 0.00005 |
| | Mcyclopentan | 0.00000 | 0.00000 | 0.00009 | 0.00003 |
| | Cyclohexane | 0.00000 | 0.00000 | 0.00005 | 0.00002 |
| | Mcyclohexane | 0.00000 | 0.00000 | 0.00004 | 0.00003 |
| | Benzene | 0.00000 | 0.00000 | 0.00008 | 0.00003 |
| | Toluene | 0.00000 | 0.00000 | 0.00002 | 0.00002 |
| | E-Benzene | 0.00000 | 0.00000 | 0.00000 | 0.00000 |
| | p-Xylene | 0.00000 | 0.00000 | 0.00000 | 0.00001 |
| | o-Xylene | 0.00000 | 0.00000 | 0.00000 | 0.00000 |
| | m-Xylene | 0.00000 | 0.00000 | 0.00000 | 0.00000 |
| | 124-MBenzene | 0.00000 | 0.00000 | 0.00000 | 0.00000 |
| Bitumen Hypothetical Components | NBP 177 | 0.00000 | 0.00000 | 0.00021 | 0.00900 |
| | NBP 191 | 0.00000 | 0.00000 | 0.00007 | 0.00931 |
| | NBP 205 | 0.00000 | 0.00000 | 0.00002 | 0.00982 |
| | NBP 220 | 0.00000 | 0.00000 | 0.00001 | 0.01040 |
| | NBP 234 | 0.00000 | 0.00000 | 0.00000 | 0.01128 |
| | NBP 248 | 0.00000 | 0.00000 | 0.00000 | 0.01225 |
| | NBP 263 | 0.00000 | 0.00000 | 0.00000 | 0.01269 |
| | NBP 277 | 0.00000 | 0.00000 | 0.00000 | 0.01344 |

TABLE 3-continued

Elevated Pressure Operation Material Balance - 2500 kPag Absorber Pressure

|  |  |  |  |  |  |
|---|---|---|---|---|---|
|  | NBP 291 | 0.00000 | 0.00000 | 0.00000 | 0.01441 |
|  | NBP 305 | 0.00000 | 0.00000 | 0.00000 | 0.01497 |
|  | NBP 320 | 0.00000 | 0.00000 | 0.00000 | 0.01519 |
|  | NBP 334 | 0.00000 | 0.00000 | 0.00000 | 0.01547 |
|  | NBP 348 | 0.00000 | 0.00000 | 0.00000 | 0.01571 |
|  | NBP 363 | 0.00000 | 0.00000 | 0.00000 | 0.01572 |
|  | NBP 377 | 0.00000 | 0.00000 | 0.00000 | 0.01599 |
|  | NBP 391 | 0.00000 | 0.00000 | 0.00000 | 0.01633 |
|  | NBP 406 | 0.00000 | 0.00000 | 0.00000 | 0.01666 |
|  | NBP 420 | 0.00000 | 0.00000 | 0.00000 | 0.01708 |
|  | NBP 441 | 0.00000 | 0.00000 | 0.00000 | 0.03382 |
|  | NBP 469-684 | 0.00000 | 0.00000 | 0.00000 | 0.32654 |
| Diluent | NBP 50 | 0.03950 | 0.00191 | 0.03301 | 0.01494 |
| Hypothetical | NBP 59 | 0.08498 | 0.00317 | 0.07110 | 0.03242 |
| Components | NBP 71 | 0.08569 | 0.00221 | 0.07201 | 0.03297 |
|  | NBP 87 | 0.09772 | 0.00148 | 0.08288 | 0.03789 |
|  | NBP 100 | 0.07103 | 0.00072 | 0.06068 | 0.02765 |
|  | NBP 117 | 0.07898 | 0.00044 | 0.06805 | 0.03084 |
|  | NBP 131 | 0.02372 | 0.00008 | 0.02053 | 0.00928 |
|  | NBP 147 | 0.04044 | 0.00008 | 0.03515 | 0.01583 |
|  | NBP 161 | 0.01123 | 0.00001 | 0.00978 | 0.00440 |
|  | NBP 174 | 0.02154 | 0.00002 | 0.01878 | 0.00844 |
|  | NBP 190 | 0.00655 | 0.00000 | 0.00572 | 0.00257 |
|  | NBP 204 | 0.00475 | 0.00000 | 0.00415 | 0.00186 |
|  | NBP 218 | 0.00488 | 0.00000 | 0.00427 | 0.00191 |
|  | NBP 232 | 0.00427 | 0.00000 | 0.00373 | 0.00168 |
|  | NBP 247-440 | 0.03102 | 0.00000 | 0.02710 | 0.01216 |
|  | Total: | 1.00000 | 1.00000 | 1.00000 | 1.00000 |

The concentration of organosulfur compounds in the oil sands produced gas may be as high as 10 mol % and varies depending on the reservoir or processing stream from which the gas is produced or provided, respectively. The GOR may be from about 5 to about 30 standard $m^3$ gas/standard $m^3$ bitumen. Oil sands produced gas may be accepted into systems according to some embodiments at a rate of about 11 standard $m^3$ gas/standard $m^3$ bitumen. The absorber is designed to accommodate a total absorber inlet gas comprised of oil sands produced gas and separated gas. The volume of separated gas is a function of the absorber pressure and the ratio of liquid hydrocarbon to absorber inlet gas. The concentration of organosulfur compounds absorbed into the bitumen-based liquid may be approximately 100 ppm (by mass) in some embodiments, but is dependent on the amount of organosulfur compounds to be removed. In some examples, the produced bitumen-based mixture may be unsaturated in organosulfur compounds.

Figure 7:
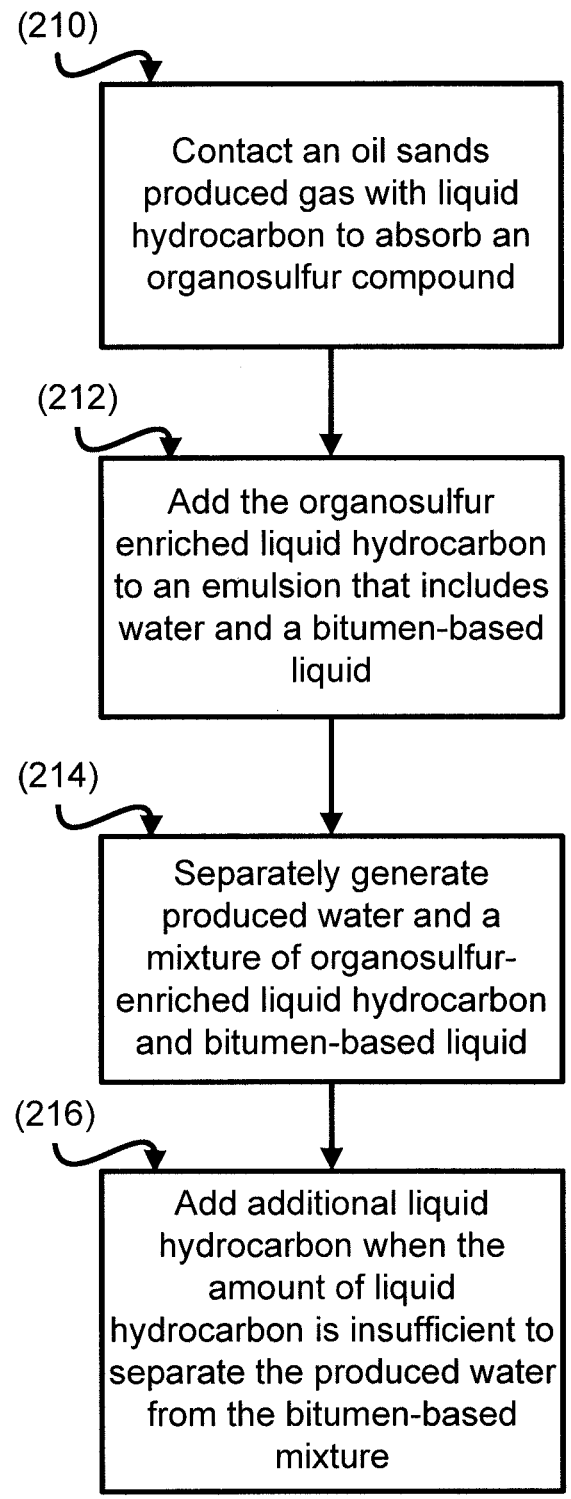
FIG. 7 is an illustration of a process according to the present disclosure.

One example of a process according to the present disclosure is illustrated in FIG. 7. The process includes: contacting the oil sands produced gas with an amount of liquid hydrocarbon sufficient to absorb at least a portion of the organosulfur compounds (210), thereby generating an organosulfur depleted gas and an organosulfur enriched liquid hydrocarbon. The process also includes: adding the organosulfur enriched liquid hydrocarbon to an emulsion comprising water and the bitumen-based liquid (212) to separately generate produced water and a mixture of organosulfur enriched liquid hydrocarbon and bitumen-based liquid (214). When the amount of liquid hydrocarbon used to absorb the organosulfur compounds from the oil sands produced gas is less than the amount of liquid hydrocarbon needed to separate the produced water from the bitumen-based mixture, the process includes adding a sufficient amount of additional liquid hydrocarbon to separate the produced water from the bitumen-based mixture (216).

The temperature of the oil sands produced gas provided to the absorber may be in the range of about 5 to about 60° C. In particular examples, the oil sands produced gas temperature is 40° C. The temperature of the liquid hydrocarbon provided to the absorber should preferably be at least 5° C. higher than the temperature of the oil sands produced gas provided to the absorber to prevent condensation of a compound that may contribute to foaming, for example organosulfur compounds, which could cause foaming or fouling in the absorber.

The oil sands produced gas may be contacted with the liquid hydrocarbon at an absorber pressure between about 200 and about 2,500 kPag.

Separately generating produced water and the bitumen-based mixture would be understood to refer to separating at least a portion of the water in the emulsion from the bitumen-based mixture. Separating at least a portion of the water in the emulsion from the bitumen-based mixture may be achieved by using, for example: heat, gravity segregation, electric current, a chemical additive, or any combination thereof, to break or reduce the emulsion. The separation may be achieved using, for example, a liquid/liquid separator such as: a free water knock out, a treater, any other separator which may be used to break or reduce the emulsion, a plurality of any of the above, or any combination thereof.

Separating at least a portion of the water in the emulsion from the bitumen-based mixture may also include separating gas from the liquids. The separated gas may be contacted with liquid hydrocarbon, for example by adding the separated gas to the oil sands produced gas.

The additional liquid hydrocarbon may be added to: the emulsion comprising water and bitumen-based liquid; the organosulfur enriched liquid hydrocarbon; the organosulfur enriched liquid hydrocarbon and bitumen-based liquid mixture; or any combination thereof. The additional liquid hydrocarbon may be added in a sufficient quantity to achieve a desired density of the bitumen-based mixture. The organosulfur enriched liquid hydrocarbon and additional liquid hydrocarbon may be added in amounts sufficient to result in the density of the bitumen-based mixture being from about 920 to about 990 kg/m³. In some embodiments the bitumen-based mixture has a density from about 940 to about 960 kg/m³.

Separately generating produced water and the bitumen-based mixture may include degassing the emulsion and contacting the separated gas with liquid hydrocarbon, for example by adding the separated gas to the oil sands produced gas.

Separately generating produced water and the bitumen-based mixture may include separating produced water from the bitumen-based mixture at a higher pressure to keep volatile compounds in the liquid stream and then degassing the liquid stream. The higher pressure may be the system pressure. Separately generating produced water and the bitumen-based mixture may include separating produced water from the bitumen-based mixture at atmospheric pressure and then degassing the liquid stream at a lower pressure. The separated gas may be contacted with liquid hydrocarbon, for example by adding the separated gas to the oil sands produced gas.

The liquid hydrocarbon may be a mixture of different hydrocarbons. The liquid hydrocarbon may be a $C_3$-$C_{30}$ hydrocarbon mixture. In particular examples, the liquid hydrocarbon is a $C_4$-$C_{20}$ hydrocarbon mixture. The liquid hydrocarbon may be an oil sands condensate, a synthetic hydrocarbon blend, naphtha, or butane. The liquid hydrocarbon may have a density in the range of about 690 to about 720 kg/m³.

The liquid hydrocarbon used to absorb the organosulfur compounds may be the same as, or different from, the additional liquid hydrocarbon added to separate the produced water from the bitumen-based mixture.

In the preceding description, for purposes of explanation, numerous details are set forth in order to provide a thorough understanding of the examples. However, it will be apparent to one skilled in the art that these specific details are not required.

The above-described examples are intended to be examples only. Alterations, modifications and variations can be effected to the particular examples by those of skill in the art without departing from the scope, which is defined solely by the claims appended hereto.

What is claimed is:

1. A process for removing at least a portion of organosulfur compounds from an oil sands produced gas and transferring the organosulfur compounds to a bitumen-based liquid, the process comprising:
    contacting the oil sands produced gas with an amount of liquid hydrocarbon sufficient to absorb at least a portion of the organosulfur compounds, thereby generating an organosulfur depleted gas and an organosulfur enriched liquid hydrocarbon;
    adding the organosulfur enriched liquid hydrocarbon to an emulsion comprising water and the bitumen-based liquid to separately generate produced water and a bitumen-based mixture of organosulfur enriched liquid hydrocarbon and bitumen-based liquid; and
    when the amount of liquid hydrocarbon used to absorb the organosulfur compounds from the oil sands produced gas is less than the amount of liquid hydrocarbon needed to separate the produced water from the bitumen-based mixture, adding a sufficient amount of additional liquid hydrocarbon to separate the produced water from the bitumen-based mixture.

2. The process according to claim 1, wherein the additional liquid hydrocarbon is added to:
    the emulsion comprising water and bitumen-based liquid;
    the organosulfur enriched liquid hydrocarbon;
    the organosulfur enriched liquid hydrocarbon and bitumen-based liquid mixture; or
    any combination thereof.

3. The process according to claim 1, wherein the organosulfur enriched liquid hydrocarbon and additional liquid hydrocarbon are added in amounts sufficient to result in the density of the bitumen-based mixture being from about 920 to about 990 kg/m³.

4. The process according to claim 1, wherein the liquid hydrocarbon, the additional liquid hydrocarbon, or both are a $C_3$-$C_{30}$ hydrocarbon mixture.

5. The process according to claim 4, wherein the liquid hydrocarbon, the additional liquid hydrocarbon, or both comprise an oil sands condensate, a synthetic hydrocarbon blend, naphtha, butane, or any combination thereof.

6. The process according to claim 1, wherein separately generating produced water and the bitumen-based mixture comprises separating at least a portion of the water in the emulsion from the bitumen-based mixture.

7. The process according to claim 1, wherein the oil sands produced gas and separated gas have a temperature between about 5 and about 60° C.

8. The process according to claim 1, wherein the temperature of the liquid hydrocarbon is at least 5° C. higher than the temperature of the oil sands produced gas and separated gas.

9. The process according to claim 1, wherein the oil sands produced gas is contacted with the liquid hydrocarbon at a pressure between about 200 and about 2,500 kPag.

10. The process according to claim 1, wherein the oil sands produced gas is contacted with the liquid hydrocarbon in a liquid/gas ratio of about 0.0001 to about 0.015 actual m³ liquid hydrocarbon/standard m³ gas.

* * * * *